(12) United States Patent
Igarashi et al.

(10) Patent No.: US 10,344,455 B2
(45) Date of Patent: Jul. 9, 2019

(54) REPLACEABLE COMPONENT MANAGEMENT SYSTEM FOR CONSTRUCTION MACHINE

(71) Applicant: HITACHI CONSTRUCTION MACHINERY CO., LTD., Tokyo (JP)

(72) Inventors: Takashi Igarashi, Tsukuba (JP); Tetsuyoshi Tominaga, Tsuchiura (JP); Hitoshi Takahashi, Tsuchiura (JP); Takami Kusaki, Kasumigaura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 124 days.

(21) Appl. No.: 15/554,796

(22) PCT Filed: Mar. 8, 2016

(86) PCT No.: PCT/JP2016/057135
§ 371 (c)(1),
(2) Date: Aug. 31, 2017

(87) PCT Pub. No.: WO2016/203795
PCT Pub. Date: Dec. 22, 2016

(65) Prior Publication Data
US 2018/0051442 A1    Feb. 22, 2018

(30) Foreign Application Priority Data
Jun. 18, 2015    (JP) ................... 2015-123054

(51) Int. Cl.
*G06F 15/173*    (2006.01)
*E02F 9/20*    (2006.01)
(Continued)

(52) U.S. Cl.
CPC .......... *E02F 9/2025* (2013.01); *E02F 9/2054* (2013.01); *E02F 9/267* (2013.01);
(Continued)

(58) Field of Classification Search
USPC .......................................... 709/223
See application file for complete search history.

(56) References Cited

U.S. PATENT DOCUMENTS 9,134,675 B2 *   9/2015   Yang ................... G03G 15/556
9,400,960 B2 *   7/2016   Clements ............... G06Q 10/04
(Continued)

FOREIGN PATENT DOCUMENTS

EP    1 286 003 A1    2/2003
JP    2002-023831 A    1/2002
(Continued)

OTHER PUBLICATIONS

Korean Office Action received in corresponding Korean Application No. 10-2017-7023648 dated Jun. 11, 2018.
(Continued)

*Primary Examiner* — Melvin H Pollack
(74) *Attorney, Agent, or Firm* — Mattingly & Malur, PC

(57) ABSTRACT

Operating information (a pilot pressure, a pump pressure, a hydraulic oil temperature, an engine rotational speed, an hour meter and the like) of a hydraulic excavator and use environment information (operator information) of the hydraulic excavator are transmitted to a center server together with body information (for example, a model, a type, a type number, an identification number and the like) from the hydraulic excavator. For example, when a hydraulic hose as a replaceable component of the hydraulic excavator is replaced, the replaceable component information (a replaceable component name and a replacement date) is transmitted to the center server from a computer for maintenance. The center server predicts a replacement time of the replaceable component (hydraulic hose) using the use environment information of the hydraulic excavator in addition (Continued)

to the operating information and the replaceable component information of the hydraulic excavator.

4 Claims, 12 Drawing Sheets

(51) Int. Cl.
| | | |
|---|---|---|
| *G06Q 10/06* | (2012.01) | |
| *G06Q 10/00* | (2012.01) | |
| *G07C 5/08* | (2006.01) | |
| *E02F 9/26* | (2006.01) | |
| *G07C 5/00* | (2006.01) | |

(52) U.S. Cl.
CPC ......... *G06Q 10/0631* (2013.01); *G06Q 10/20* (2013.01); *G07C 5/085* (2013.01); *G07C 5/008* (2013.01)

(56) References Cited

U.S. PATENT DOCUMENTS

| | | | |
|---|---|---|---|
| 9,436,444 B2* | 9/2016 | Hightower | G06F 8/36 |
| 9,514,577 B2* | 12/2016 | Ahn | G07C 5/0808 |
| 9,542,436 B2* | 1/2017 | Quadracci | G06F 16/285 |
| 9,623,350 B2* | 4/2017 | Rohrbach | B01D 35/005 |
| 9,658,611 B2* | 5/2017 | Tong | G05B 19/4065 |
| 9,679,253 B2* | 6/2017 | Gnocato | G06N 7/005 |
| 2002/0046048 A1 | 4/2002 | Fukushima et al. | |
| 2005/0021245 A1 | 1/2005 | Furuno et al. | |
| 2008/0270074 A1 | 10/2008 | Horkavi et al. | |
| 2009/0259507 A1 | 10/2009 | Miwa et al. | |

FOREIGN PATENT DOCUMENTS

| | | |
|---|---|---|
| JP | 2002-99598 A | 4/2002 |
| JP | 2003-140743 A | 5/2003 |
| JP | 2007-100305 A | 4/2007 |
| JP | 2008-180024 A | 8/2008 |
| JP | 4689134 B2 | 5/2011 |
| KR | 10-2004-0073564 A | 8/2004 |
| WO | 01/73217 A1 | 10/2001 |

OTHER PUBLICATIONS

International Search Report of PCT/JP2016/057135 dated Jun. 14, 2016.

Extended European Search Report received in corresponding European Application No. 16811270.4 dated Oct. 16, 2018.

Korean Office Action received in corresponding Korean Application No. 10-2017-7023648 dated Dec. 17, 2018.

* cited by examiner

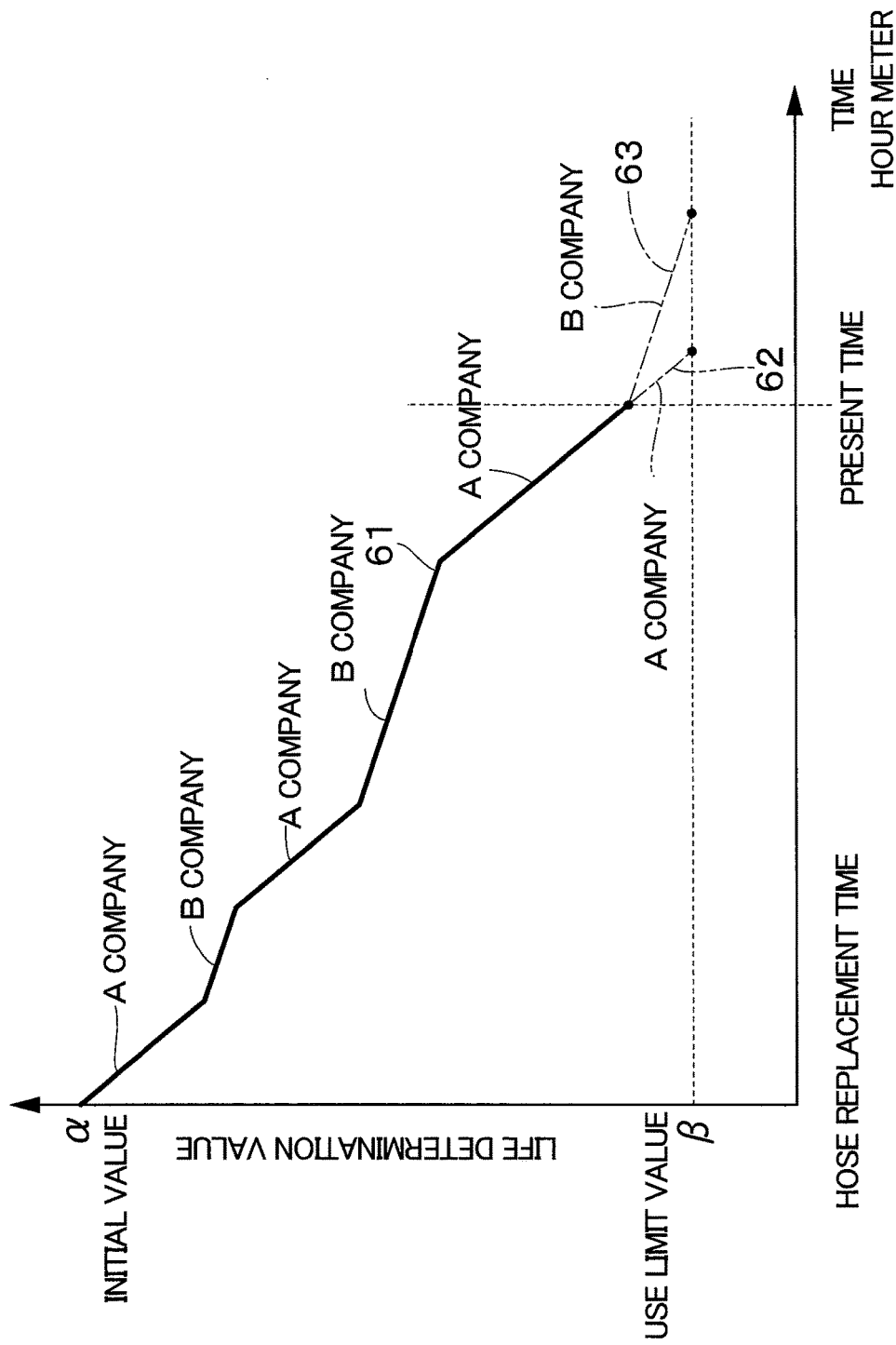

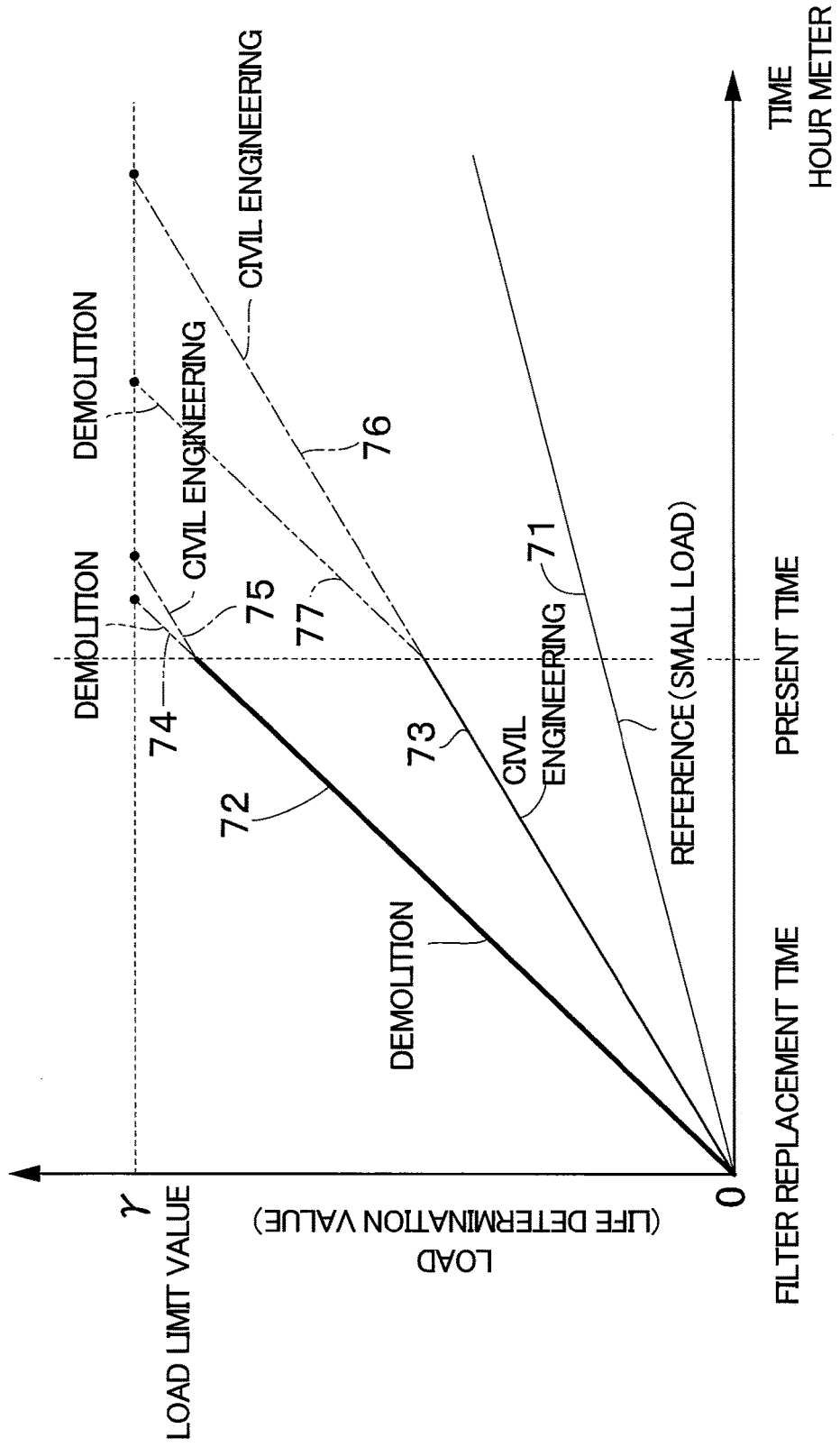

REPLACEABLE COMPONENT MANAGEMENT SYSTEM FOR CONSTRUCTION MACHINE

TECHNICAL FIELD

The present invention relates to a replaceable component management system for a construction machine that manages replaceable components in a construction machine, for example, a hydraulic hose, an air filter and the like.

BACKGROUND ART

In general, a construction machine of a hydraulic excavator, a wheel loader, a hydraulic crane or the like is configured of various components, and some of the components are replaceable components (maintenance target components) requiring replacement at the time of coming to the end of their life.

For example, the replaceable components of the hydraulic excavator are shown as follows. That is, an example of the replaceable components may include an arm and a bucket that configure a working device, connecting pins that connects them, bushes (bearing tubes) that support the connecting pins, grease that lubricates the connecting pins and the bushes, a bucket stopper, transmission oil for a revolving device, a transmission seal for a traveling device, revolving bearings (revolving wheels), grease for a revolving device, transmission oil for a traveling device, a transmission seal for a traveling device, traveling hydraulic motors, traveling rollers, crawlers, shoes of the crawlers, engine oil, an engine oil filter, an air filter, hydraulic oil, a hydraulic oil filter (oil filter), a hydraulic hose and the like.

In regard to these replaceable components, a replacement time (use enable period or durable period) is equally set for each of the replaceable components), and upon coming to the replacement time, the replaceable component is replaced by a new component in a maintenance factory (service factory) for inspection, repair, maintenance and the like of the construction machine. However, the replacement time of the replaceable components is equally set, the replacement is possibly performed regardless of a remaining time of the life.

On the other hand, Patent Document 1 describes a management system in a construction machine that individually predicts (calculates) a replacement time of each of the replaceable components for each one of the construction machines 1 (for example, for each one of hydraulic excavators 1). The management system predicts the replacement time of each of the replaceable components based upon operating information (a pilot pressure, a pump pressure, a hydraulic oil temperature, an engine operating time, and an engine rotational speed) and replaceable component information (replaceable component names and replacement dates) of the construction machine until the present time

PRIOR ART DOCUMENT

Patent Document

Patent Document 1: Japanese Patent No. 4689134 B2

SUMMARY OF THE INVENTION

According to the conventional technology, the operating information and the replaceable component information of the construction machine until the present time are used for the prediction of the replacement time of the replaceable component. On the other hand, information in regard to a use aspect of the construction machine is thought to be used for the prediction of the replacement time of the replaceable component, for example. Specifically an example of use environment information of the construction machine includes an operator of a construction machine, a user (use company) of a construction machine, a business category of a user, an area of a user, a working content (construction content and working content) of a construction machine, a working area and the like. In this case, a history of the use aspects of the construction machine, a future use aspect supposed from the history and the like can be considered for the prediction of the replacement time of the replaceable component to perform more fine prediction and more accurate prediction.

An object of the present invention is to provide a replaceable component management system for a construction machine that can perform more fine prediction and more accurate prediction of a replacement time of a replaceable component.

A replaceable component management system for a construction machine according to the present invention comprises: an operating information memory section for storing operating information including a detection value and an operating time of each of components in a construction machine; a replaceable component information memory section for storing replaceable component information including a use start date of a replaceable component in the construction machine requiring replacement upon coming to the end of their life; and a replacement time predicting section for predicting a replacement time of the replaceable component by using the operating information stored in the operating information memory section and the replaceable component information stored in the replaceable component information memory section.

For solving the aforementioned problems, the configuration adopted by the present invention is characterized in that: the replaceable component management system for the construction machine includes: a use environment memory section for storing, as use environment information of the construction machine, at least one use aspect of use aspects of the construction machine including an operator, a user, a business category of a user, an area of a user, a working content, and a working area of the construction machine, which is information different from the operating information and the replaceable component information, wherein the replacement time predicting section predicts the replacement time of the replaceable component by using the use environment information stored in the use environment memory section in addition to the operating information and the replaceable component information.

According to the present invention, it is possible to perform more fine prediction and more accurate prediction of the replacement time of the replaceable component.

BRIEF DESCRIPTION OF THE DRAWINGS

FIG. 11 is an explanatory diagram showing an example of calculating a life according to a second embodiment.

FIG. 12 is an explanatory diagram showing an example of calculating a life according to a third embodiment.

MODE FOR CARRYING OUT THE INVENTION

Hereinafter, replaceable component management systems for construction machines according to embodiments of the present invention will be in detail explained with reference to the accompanying drawings, by taking a case of being applied to replaceable component management systems for hydraulic excavators as an example.

Figure 1:
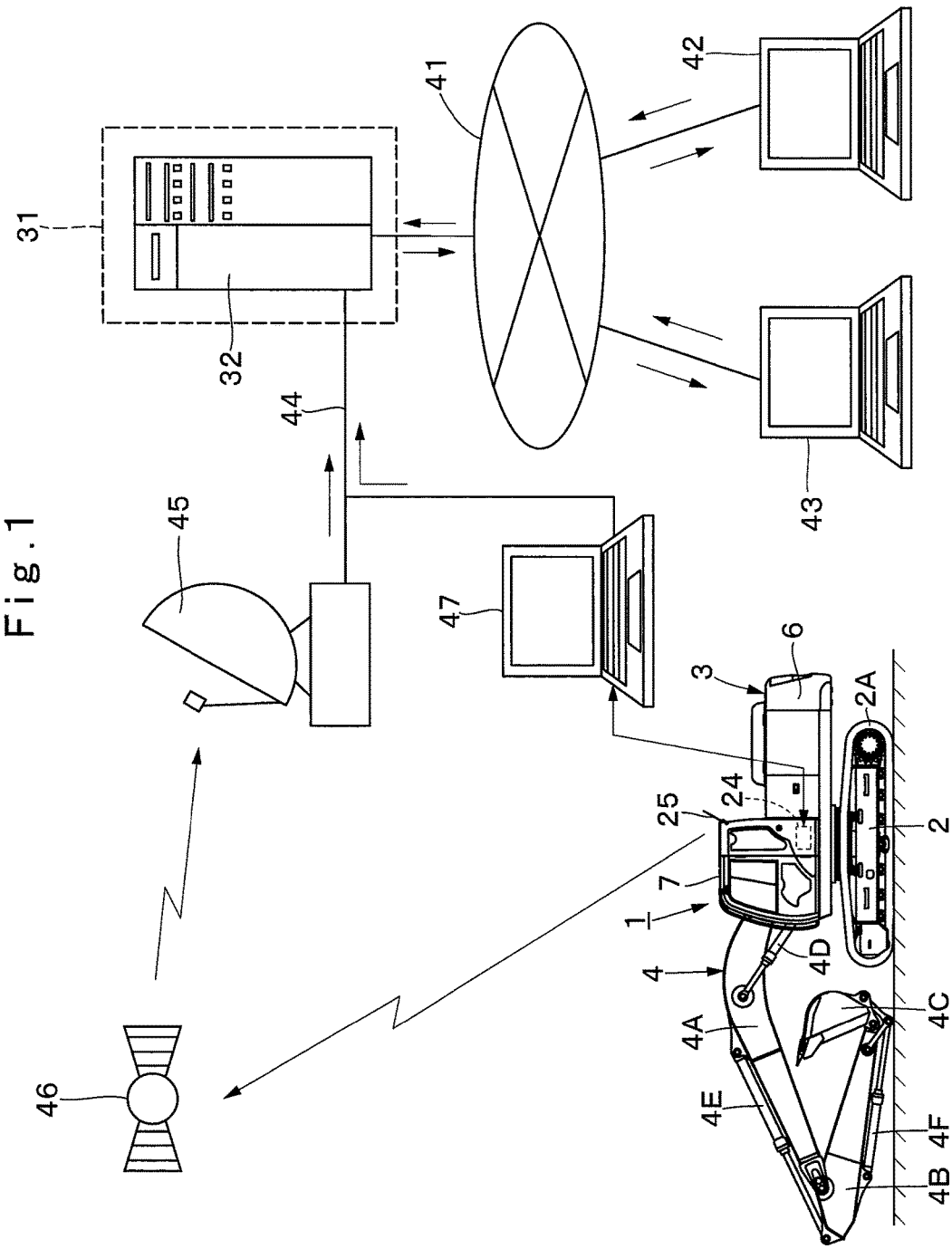
FIG. 1 is a schematic diagram showing a replaceable component management system in a hydraulic excavator according to an embodiment.

FIG. 1 to FIG. 10 show a first embodiment. In FIG. 1, a hydraulic excavator 1 as a representative example of construction machines is shipped from a factory of a manufacturer (maker) of the hydraulic excavator 1, and works in a working site (construction site) of a civil engineering work, a construction work, a demolition work, a dredging work or the like. In FIG. 1, for simplification in Figs., only a single hydraulic excavator 1 is shown, but in fact, a plurality of hydraulic excavators 1 work in various working sites. The replaceable component management system in the embodiment performs not only management (prediction of a replacement time of a replaceable component) of the single hydraulic excavator 1 shown in FIG. 1 but also management (prediction of replacement times of replaceable components) of a plurality of hydraulic excavators, which are not shown, in parallel.

A management center 31 is called a base station as well, for example, and is provided with a management server configuring the replaceable component management system for the hydraulic excavator 1, that is, a center server 32. The management center 31 may be installed in, for example, a main office, a branch office, a factory or the like of a manufacturer of the hydraulic excavator 1. It should be noted that the management center 31 is not limited to the facilities of the manufacturer, but may be installed in a data center and the like for professionally running the management of a server, for example. Further, the management center 31 may be installed in, for example, a rental company of the hydraulic excavator 1 owning a plurality of hydraulic excavators 1.

The center server 32 is connected to an internal computer 42, a user-side computer 43 and the like through a communication line 41 of a private line, a public line, an Internet line, an optical line, a phone line and the like. The internal computer 42 is installed within a company of a manufacturer, such as a main office, a branch office, a factory, a branch shop, a service factory (maintenance factory) and the like of the manufacturer. The user-side computer 43 is a computer different from the internal computer 42, and, for example, is used by a person other than the manufacturer of the hydraulic excavator 1. For example, the user-side computer 43 is a computer to be used by a user (use company) using the hydraulic excavator 1, an owner of the hydraulic excavator 1, a manager of the hydraulic excavator 1 and the like.

Further, the center server 32 is connected to a ground station 45 of a satellite communication through a communication line 44 of a private line, a public line, an Internet line, an optical line, a phone line and the like. Information from the hydraulic excavator 1 is input to the center server 32 through a communication satellite 46. As described later, the center server 32 stores (reserves, stores and accumulates) the information of the hydraulic excavator 1. In addition thereto, the center server 32 predicts (calculates) a replacement time of a replaceable component in the hydraulic excavator 1, and outputs (transmits) the information in regard to the replacement time to the internal computer 42, the user-side computer 43 and the like as needed.

It should be noted that in FIG. 1, for clarifying the information input to the center server 32 from the hydraulic excavator 1, the communication line 44 to be connected to the hydraulic excavator 1 is shown to be separate from the communication line 41 to be connected to the internal computer 42 and the like. This only shows the separated state for illustrative purposes, and does not mean a physical separation between the communication line 41 and the communication line 44 (being composed of different lines). That is, the communication line 44 may be connected to the communication line 41.

In addition, the hydraulic excavator 1 uses the satellite communication as a wireless communication, but, not limited to the satellite communication, may use, for example, a mobile communication to be performed through a wireless base station of a mobile phone (mobile computer). In any case, transmission/reception of information (data) between the center server 32 and the hydraulic excavator 1, and transmission/reception of information between the center server 32 and the internal computer 42 or the like can be performed using various types of communication lines including a wireless communication and a wired communication. Further, delivery and receipt of information are not limited to the transmission/reception by communication lines, but information may be reserved, for example, in a memory medium (an external memory medium, a mobile memory medium or the like) of a USB memory or the like, and the delivery and receipt of the information may be carried out through the memory medium.

The hydraulic excavator 1 is provided with a controller 24 and a communication antenna 25, which will be described later. The controller 24 in the hydraulic excavator 1 collects the information (for example, operating information, use environment information and the like) of the hydraulic excavator 1 to be described later. The controller 24 transmits (outputs) the collected information together with body information (for example, a model, a type, a type number, an identification number and the like) of the hydraulic excavator 1 through the communication antenna 25, the communication satellite 46, the ground station 45 and the communication line 44. It should be noted that in a case where the hydraulic excavator 1 works in a working site of being incapable of communicating with the communication satellite 46, the information of the hydraulic excavator 1 can be transmitted (outputted) to the center server 32 through a computer 47 for maintenance. This is likewise applied to a case where the hydraulic excavator 1 is not provided with the communication antenna 25.

Here, the computer 47 for maintenance is, for example, a computer connectable with the controller 24 of the hydraulic excavator 1. The computer 47 for maintenance is used, for example, by sales outlets (agents) of the hydraulic excavator 1 and by persons in charge of services performing maintenance (persons in charge of maintenance) of the hydraulic excavator 1 in a service factory or the like. The person in charge of services connects the computer 47 for maintenance to the controller 24 in the hydraulic excavator 1. Thereby, the person in charge of services can incorporate the information collected by the controller 24 (the operating information and use environment information accumulated in a memory 24D in the controller 24) in the computer 47 for maintenance together with the body information of the hydraulic excavator 1.

It should be noted that the incorporation of the information into the computer 47 for maintenance may be performed by direct connection of the controller 24 in the hydraulic excavator 1 and the computer 47 for maintenance by a communication cable, for example. In addition, a memory medium of a USB memory or the like is connected to the controller 24, the information is once incorporated in the memory medium, and then, the information may be incorporated in the computer 47 for maintenance through the memory medium.

The information incorporated in the computer 47 for maintenance can be transmitted (outputted) to the center server 32 through the communication line 44 by an operation of a person in charge of services, for example. Further, the person in charge of services, for example, at the time of performing an inspection (a regular inspection) of the hydraulic excavator 1, inputs information of the inspection result (inspection information) to the computer 47 for maintenance. The person in charge of services, for example, at the time of performing a repair of the hydraulic excavator 1, inputs information of the repair result (repair information) to the computer 47 for maintenance. The person in charge of services, for example, at the time of replacing a replaceable component of the hydraulic excavator 1, inputs information of the replaceable component (replaceable component information) to the computer 47 for maintenance.

The person in charge of services transmits (outputs) these pieces of the information (maintenance information in regard to inspections, repairs and replacements) to the center server 32 from the computer 47 for maintenance through the communication line 44 and the like. It should be noted that the replaceable component information includes, for example, a name (replaceable component name) of the replaced replaceable component and a replacement date thereof. The replaceable component information is input to the computer 47 for maintenance not only at the time of replacing a replaceable component based upon coming to the replacement time but also, for example, when the replacement is performed since it is determined that the replacement is necessary following the inspection. In addition, the replaceable component information is input to the computer 47 for maintenance also when the replacement is performed by the repair following damages of the replaceable component or the like. That is, the replaceable component information is input to the computer 47 for maintenance at the time of replacing the replaceable component regardless of the reason for replacement.

Next, an explanation will be made of the hydraulic excavator 1 working at a working site with reference to FIG. 2 as well as FIG. 1.

The hydraulic excavator 1 includes an automotive lower traveling structure 2 of a crawler type, an upper revolving structure 3 that is mounted to be capable of revolving on the lower traveling structure 2 and configures a vehicle body together with the lower traveling structure 2, and a working mechanism 4 that is provided in the front side of the upper revolving structure 3 to be capable of lifting and tilting thereto. The hydraulic excavator 1 can perform an excavating work of earth and sand, and the like using the working mechanism 4.

Here, the lower traveling structure 2 includes, for example, crawler belts 2A and left, right traveling hydraulic motors 2B, 2C that cause the hydraulic excavator 1 to travel by revolving the crawler belts 2A. On the other hand, the working mechanism 4 is called a front (front device) as well, and includes, for example, a boom 4A, an arm 4B, a bucket 4C as a working tool, and a boom cylinder 4D, an arm cylinder 4E and a bucket cylinder 4F as a working tool cylinder for driving them. The boom cylinder 4D, the arm cylinder 4E and the bucket cylinder 4F composed of hydraulic cylinders, and the traveling hydraulic motors 2B, 2C and the revolving hydraulic motor 5 to be described later composed of the hydraulic motors act as hydraulic actuators (hydraulic equipment and hydraulic devices) that are respectively driven (operated) based upon supply of the hydraulic oil.

The upper revolving structure 3 includes the revolving hydraulic motor 5 that revolves the upper revolving structure 3 to the lower traveling structure 2, a counterweight 6 for acting as a weight balance to the working mechanism 4, further, a cab 7, an engine 8, hydraulic pumps 9A, 9B, a pilot pump (not shown), a control valve 13 and the controller 24.

The cab 7 defines an operating room and is provided on a front left side of the upper revolving structure 3. An operator's seat (not shown) on which an operator sits is provided in the cab 7. Traveling control lever devices 10A, 10B and working control lever devices 11A, 11B are provided on the periphery of the operator's seat. The control lever devices 10A, 10B, 11A 11B output pilot signals (pilot pressures) in response to tilting operations of control levers by an operator to the control valve 13.

Further, the controller 24 to be described later is provided in the cab 7 to be positioned in a rear lower side of the operator's seat, for example. In addition, an RFID readout device 26 (FIG. 3) to be described later is provided in the cab 7 to be positioned near the operator's seat. The RFID readout device 26 reads out identification information (a specific identification code or ID given to each portable device 27) of the portable device 27, such as a non-contact IC card, an IC tag, a mobile phone, a mobile key and the like, which are owned by an operator or the like.

The engine 8 is disposed in a horizontal state in front of the counterweight 6. The engine 8 is configured of an internal combustion engine, for example, a diesel engine. The hydraulic pumps 9A, 9B and the pilot pump (not shown) are attached on one side in the left-right direction (for example, on the right side) of the engine 8.

The hydraulic pumps 9A, 9B and the pilot pump are attached on an output side of the engine 8. The hydraulic pumps 9A, 9B are driven by the engine 8. The hydraulic pumps 9A, 9B supply (deliver) pressurized oil for operation to various types of hydraulic actuators (the left, right traveling hydraulic motors 2B, 2C, the respective cylinders 4D, 4E, 4F, the revolving hydraulic motor 5 and the like) mounted on the hydraulic excavator 1. The hydraulic pumps 9A, 9B are configured as variable displacement hydraulic pumps of a swash plate type, for example.

On the other hand, the pilot pump is also driven by the engine 8 to be similar to the hydraulic pumps 9A, 9B. The pilot pump supplies (delivers) pressurized oil (pilot pressure) as a pilot signal to the control valve 13 through the control lever devices 10A, 10B, 11A 11B.

A hydraulic oil tank 12 is provided near the hydraulic pumps 9A, 9B (for example, in the front side of the vehicle body in a front-rear direction). The hydraulic oil tank 12 reserves hydraulic oil to be supplied to the hydraulic actuators (the hydraulic cylinders 4D, 4E, 4F, and the hydraulic motors 2B, 2C, 5).

The control valve 13 is a control valve device composed of a collector of a plurality of directional control valves. The control valve 13 controls directions of the pressurized oil to be delivered to the various types of the hydraulic actuators 4D, 4E, 4F, 2B, 2C, 5 from the hydraulic pumps 9A, 9B in response to lever operations of the traveling control lever devices 10A, 10B and the working control lever devices 11A, 11B arranged in the cab 7. Thereby, the hydraulic actuators 4D, 4E, 4F, 2B, 2C, 5 are driven by the pressurized oil to be delivered from the hydraulic pumps 9A, 9B.

Here, the control valve 13 includes boom control valves 13A, 13B, an arm control valve 13C, a bucket control valve 13D, a revolving control valve 13E, and traveling control valves 13F, 13G. When an operator operates the control lever of the working control lever device 11A in one direction of a cross, a pilot pressure of an arm cloud or a pilot pressure of an arm dump is outputted to the arm control valve 13C through the working control lever device 11A. When the operator operates the control lever of the working control lever device 11A in the other direction of the cross, a pilot pressure in the right turn or a pilot pressure in the left turn is outputted to the revolving control valve 13E through the working control lever device 11A.

When an operator operates the control lever of the working control lever device 11B in one direction of a cross, a pilot pressure for boom-raising or a pilot pressure for boom-lowering is outputted to the boom control valves 13A, 13B through the working control lever device 11B. When the operator operates the control lever of the working control lever device 11B in the other direction of the cross, a pilot pressure for a bucket cloud or a pilot pressure for a bucket dump is outputted to the bucket control valve 13D through the working control lever device 11B. Further, when the operator operates the control levers of the traveling control lever devices 10A, 10B, a pilot pressure for left traveling and a pilot pressure for right traveling are outputted to the traveling control valves 13F, 13G through the traveling control lever devices 10A, 10B.

Next, an explanation will be made of sensors that detect state amounts of respective components of the hydraulic excavator 1.

Figure 2:
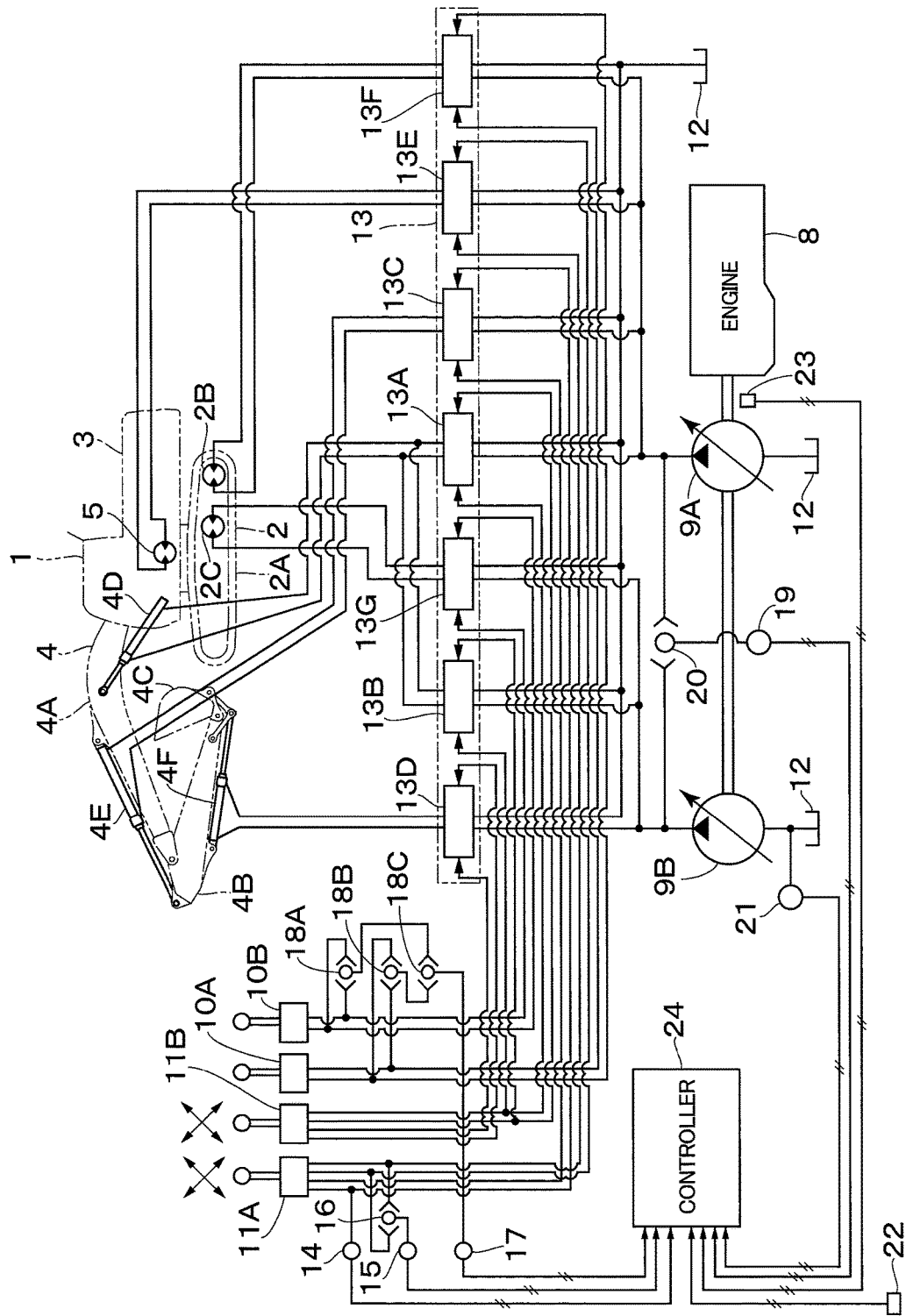
FIG. 2 is a hydraulic circuit diagram of the hydraulic excavator in FIG. 1.

Respective sensors 14, 15, 17, 19, 21, 22, 23 in FIG. 2 are provided in the respective components of the hydraulic excavator 1, and detect state amounts changing with the working of the hydraulic excavator 1. Specifically, the pressure sensor 14 is provided (in an oil passage) between the working control lever device 11A and the arm control valve 13C. The pressure sensor 14 detects the pilot pressure of the arm cloud as an operating signal of the working mechanism 4.

The pressure sensor 15 is provided (in an oil passage) between the working control lever device 11A and the revolving control valve 13E through a shuttle valve 16. The pressure sensor 15 detects the pilot pressure for revolving taken out through the shuttle valve 16 as a revolving operating signal.

The pressure sensor 17 is provided (in an oil passage) between the traveling control lever devices 10A, 10B and the traveling control valves 13F, 13G through shuttle valves 18A, 18B, 18C. The pressure sensor 17 detects the pilot pressure for traveling taken out through the shuttle valves 18A, 18B, 18C as a traveling operating signal.

The pressure sensor 19 is provided (in an oil passage) between the hydraulic pumps 9A, 9B and the control valve 13 through a shuttle valve 20. The pressure sensor 19 detects a delivery pressure of the hydraulic pumps 9A, 9B for traveling taken out through the shuttle valve 20, that is, a pump pressure. The oil temperature sensor 21 is provided (in an oil passage) between the hydraulic pumps 9A, 9B and the hydraulic oil tank 12. The oil temperature sensor 21 detects a temperature of the hydraulic oil (oil temperature).

The key sensor 22 detects ON/OFF of a start stop switch of a key switch, an ignition switch, a power switch and the like, which is operate by an operator, that is, detects ON/OFF of the start stop switch that performs power supply/non-power supply of accessories (electrical equipment) of a vehicle and a start/stop of the engine 8. The rotational speed sensor 23 detects a rotational number (rotational speed) of an output shaft (crank shaft) of the engine 8. The respective sensors 14, 15, 17, 19, 21, 22, 23 are connected to the controller 24, and detection signals of the respective sensors 14, 15, 17, 19, 21, 22, 23 are outputted to the controller 24.

Figure 3:
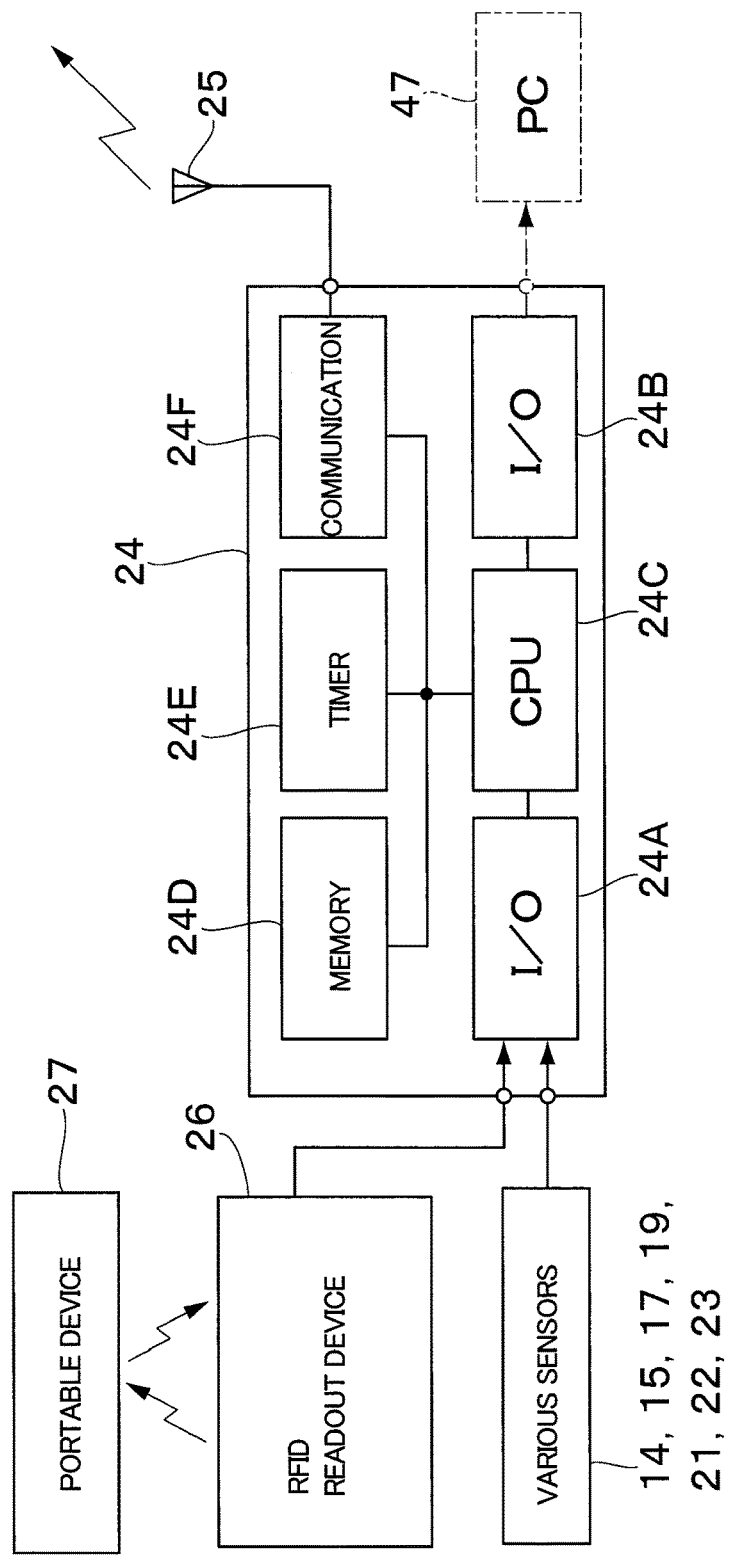
FIG. 3 is a block diagram showing a controller in the hydraulic excavator.

Next, an explanation will be made of a body-side controller, that is, the controller 24 in the hydraulic excavator 1 with reference to FIG. 1 and FIG. 2, further, to FIG. 3. It should be noted that in FIG. 3, for avoiding complication of the drawing, the respective sensors 14, 15, 17, 19, 21, 22, 23 are expressed together as "various sensors".

The controller 24 performs control of various types of equipment mounted on the hydraulic excavator 1, such as the engine 8, the hydraulic pumps 9A, 9B and the like. In addition, the controller 24 collects (acquires) the information (for example, the operating information, use environment information and the like) of the hydraulic excavator 1. The controller 24 transmits (outputs) the collected information to the center server 32 through the communication antenna 25. The controller 24 is configured of, for example, a microcomputer and the like, and includes input/output interfaces 24A, 24B, a CPU (central processing section) 24C, the memory 24D, a timer 24E, and a communication control section 24F. The memory 24D is configured of, for example, a flash memory, a ROM, a RAM, an EEPROM and the like (memory device).

Detection signals of the respective sensors 14, 15, 17, 19, 21, 22, 23 are input to the controller 24 through the input/output interface 24A. Specifically, a signal of a pilot pressure in regard to working, revolving and traveling, a signal of a rotational number (rotational speed) of an engine, a signal of ON/OFF of an accessory (start/stop of the engine 8), a signal of a pump pressure and a signal of an oil temperature are input to the controller 24 as input information.

The CPU 24C processes the input information to given operating information (for example, a detection value corresponding to date and time) using the timer 24E including a clock function to be stored (reserved, stored and accumulated) in the memory 24D. The operating information may be stored as a detection value at intervals of one second during the working, for example, in the memory 24D or may be stored as a detection value at intervals of one minute, five minutes, ten minutes, 30 minutes or one hour in the memory 24D. Further, the operating information may be configured to store how many times a given value (for example, a peak value) has reached within a given time, how many hours a time having surpassed a given value amounts to, or an average value for every given time (for example, every ten-minute or every 30-minute) in the memory 24D. What kind of data the data of the detection value (state amount) to be stored in the memory 24D is made to, and further, how frequently the data amount is acquired can be set as the data amount that makes it possible to secure accuracy in prediction of a replacement time of a replaceable component to be described later and that is storable in the memory 24D.

In any case, when the hydraulic excavator 1 is working, the operating information is sequentially stored in the memory 24D. The operating information includes, for example, a pilot pressure of the working, a pilot pressure of the revolving, a pilot pressure of the traveling, a pump pressure, a hydraulic oil temperature, an engine rotational speed and an engine operating time. The engine operating time may adopt a time of an hour meter by integrating hours from key ON (accessory ON) to key OFF (accessory OFF). Further, a processing program for executing a processing flow shown in FIG. 5 to be described later is preliminarily stored in the memory 24D. The CPU 24C regularly outputs (transmits) the operating information stored in the memory 24D to the center server 32 in the management center 31 through the communication control section 24F, based upon the processing program in FIG. 5 (processing at S6).

For example, when the working site of the hydraulic excavator 1 is a site of being capable of establishing communications (data transmission) with the communication satellite 46, the operating information accumulated from the previous transmission to the present time is transmitted through the communication antenna 25 to the center server 32 at a given time once per day. At this time, the body information of the hydraulic excavator 1 and the use environment information to be described later together with the operating information can be transmitted. The body information includes information for identifying the body, such as a model, a type, a type number, an identification number and the like of the hydraulic excavator 1. The use environment information includes information in regard to a use aspect, such as an operator, a user (use company), a business category of a user, an area of a user, a working content and a working area of the hydraulic excavator 1.

On the other hand, in a case of a working site where the communications with the communication satellite 46 cannot be carried out, for example, when the hydraulic excavator 1 is carried in a maintenance factory, the operating information and the use environment information stored in the memory 24D are incorporated (downloaded) in the computer 47 for maintenance together with the body information. The same is applied to a case where the hydraulic excavator 1 is not provided with the communication antenna 25. The incorporation into the computer 47 can be made by connecting the computer 47 or a memory medium of a USB memory or the like to the input/output interface 24B in the controller 24. The body information, the operating information and the use environment information incorporated in the computer 47 are transmitted from the computer 47 to the center server 32. It should be noted that the processing in FIG. 5 to be executed by the controller 24 will be described later.

Next, an explanation will be made of the RFID readout device 26 connected to the controller 24.

The RFID readout device 26 as a readout device is provided in the cab 7 of the hydraulic excavator 1, for example, and is connected to the input/output interface 24A of the controller 24. The RFID readout device 26 performs recognition by RFID (Radio Frequency Identification), and, for example, establishes wireless communications (short-distance wireless communications) with the portable device 27 such as the non-contact IC card, the IC tag, the mobile phone, the portable key and the like, which is owned by an operator. The portable device 27 stores (sets and registers) therein specific identification information (a specific identification code and a recognition ID provided for each portable device 27). For example, the respective operators who operate the hydraulic excavator 1 have their own portable devices 27 in which pieces of identification information differing from each other are stored. When the operator, for example, upon working (operating) the hydraulic excavator 1, exposes his or her own portable device 27 on the RFID readout device 26, the RFID readout device 26 reads out the identification information stored in the portable device 27.

The identification information of the portable device 27 read out by the RFID readout device 26 is stored in the memory 24D of the controller 24. The identification information of the portable device 27 corresponds to the use environment information as the use aspect of the hydraulic excavator 1. Specifically, the use environment information corresponds to operator information (for example, an operator name, sex of an operator, an age of an operator, an organization name of an operator, a nationality of an operator and the like) about who is an operator operating the hydraulic excavator 1. The identification information of the portable device 27 is transmitted to the center server 32 as the use environment information together with the body information and the operating information.

Here, the use environment information can be transmitted to the center server 32 as the identification information of the portable device 27. That is, a corresponding relation between the identification information of the portable device 27 and the operator information corresponding to the identification information is preliminarily registered (stored and reserved) in the memory device 36 in the center server 32. In this case, the center server 32 can automatically convert the identification information into the operator information of the hydraulic excavator 1 from the transmitted identification information and the preliminarily registered corresponding relation to be stored together with the body information and the operating information.

On the other hand, the corresponding relation between the identification information of the portable device 27 and the operator information corresponding to the identification information can be preliminarily registered in the memory 24D in the controller 24. In this case, the controller 24 automatically converts the identification information read out in the RFID readout device 26 into the operator information to be stored in the memory 24D. The controller 24 can transmit the operator information to the center server 32.

The use environment information of the hydraulic excavator 1 is information of the use aspect of the hydraulic excavator 1, and in the first embodiment, the operator information of the hydraulic excavator 1 is configured as the use environment information. The center server 32 or the controller 24 is configured to use the operator information corresponding to the identification information of the portable device 27 for prediction of the replacement time of the replaceable component to be described later. Here, the use aspect of the hydraulic excavator 1 as the use environment information is not limited to the operator information of the hydraulic excavator 1. An example of the information of the use aspect of the hydraulic excavator 1 may include information (user information) of a user (may be an owner or a manager), information of a business category of a user (business category information), information of an area of a user (area information), information (working information and construction information) of a working content (a construction content and working content), information (working area information) of a working area and the like.

Therefore, the user information, the business category information, the area information, the working information, the working area information and the like can be used together with the operator information or instead of the operator information. In this case, the user information, the business category information, the area information, the working information, the working area information and the like are registered to the center server 32 (the memory device 36 thereof) or the controller 24 (the memory 24D thereof) together with the operator information or instead of the operator information, as the information corresponding to the identification information of the portable device 27. In any case, the registration to the center server 32 or to the controller 24, that is, the registration of the identification information of the portable device 27 and the use environment information corresponding thereto may be performed by using the internal computer 42, the user-side computer 43, and the computer 47 for maintenance.

It should be noted that the RFID readout device 26 may be configured to be incorporated in the controller 24. In addition, the RFID readout device 26 may be fixedly provided in the hydraulic excavator 1 or may be provided to be capable of being mounted on/removed from the hydraulic excavator 1. That is, only when the readout is necessary, the RFID readout device 26 may be carried in the hydraulic excavator 1, and the RFID readout device 26 and the controller 24 may be connected by, for example, a USB cable, causing the RFID readout device 26 to read out the portable device 27. In this case, one RFID readout device 26 can be commonly used in a plurality of hydraulic excavators 1. Therefore, as compared to the configuration of providing the RFID readout device 26 for each of the hydraulic excavators 1, the cost can be reduced to be smaller.

Further, the controller 24 in the hydraulic excavator 1 is provided with an activation determining section (processing at S2 and S7 in FIG. 5 to be described later) that determines whether or not an activation (start of the engine 8) of the hydraulic excavator 1 is permitted based upon the identification information of the portable device 27 read out in the RFID readout device 26. That is, the identification information permitting the activation of the hydraulic excavator 1 is preliminarily registered in the controller 24 (in the memory 24D thereof). The controller 24 may permit the start of the engine 8 when the identification information read out in the RFID readout device 26 is the preliminarily registered one, and may control the engine 8 to prohibit the start of the engine 8 when not the registered one. In this case, it is possible to cause the portable device 27 to have a function of security in addition to a function of acquiring the use environment information (operator information).

Incidentally, the hydraulic excavator 1 is configured of various components, and some of them are replaceable components (maintenance target components) that need replacement upon coming to the end of their life. An example of these replaceable components may include the arm 4B and the bucket 4C configuring the working mechanism 4, the connecting pins for connecting them, the bushes (bearing tubes) for supporting the connecting pins, grease for lubricating the connecting pins and the bushes, the bucket stopper, the transmission oil of the revolving device including the revolving hydraulic motor 5 and a reduction gear mechanism, the transmission seal of the revolving device, the revolving bearings (revolving wheels), grease of the revolving device, the transmission oil of the traveling device including the traveling hydraulic motors 2B, 2C and the reduction gear mechanism, the transmission seal of the traveling device, the traveling hydraulic motors 2B, 2C, the traveling rollers, the crawler belts 2A, the shoes of the crawler belts 2A, the engine oil, the engine oil filter, the air filter, the hydraulic oil, the hydraulic oil filter (oil filter), the hydraulic hose and the like.

Such replaceable components are replaced by new components in a maintenance factory (service factory) for performing inspection, repair, maintenance and the like of the hydraulic excavator 1 upon coming to the replacement time. At this time, a person in charge of services (person in charge of maintenance), when the replaceable component is replaced, inputs (registers) replaceable component information (for example, a replaceable component name and a replacement date) as information of the replaceable component to the computer 47 for maintenance. The replaceable component information is transmitted (outputted) to the center server 32 from the computer 47 for maintenance through the communication line 44 and the like by an operation of the person in charge of services to be stored (reserved) in the center server 32. As described later, the center server 32 performs prediction of the replacement time of the replaceable component using the replaceable component information, the operating information and the use environment information.

It should be noted that the replaceable component information may be configured to be input (registered), for example, to the controller 24 (the memory 24D thereof) in the hydraulic excavator 1 instead of being configured to be input to the computer 47 for maintenance. In this case, for example, the person in charge of services, when the replaceable component is replaced, inputs (stores) the replaceable component information to the controller 24 (the memory 24D thereof) using the monitor (shown) and the input device (input switch) of the hydraulic excavator 1.

The controller 24 transmits the replaceable component information stored in the memory 24D, for example, together with the operating information and the use environment information. The inspection information and the repair information of the hydraulic excavator 1 may be also input to the controller 24 as similar to the replaceable component information. Further, the replaceable component information, the inspection information and the repair information may be input, for example, to the user-side computer 43 and may be transmitted (outputted) to the center server through the user-side computer 43.

Figure 4:
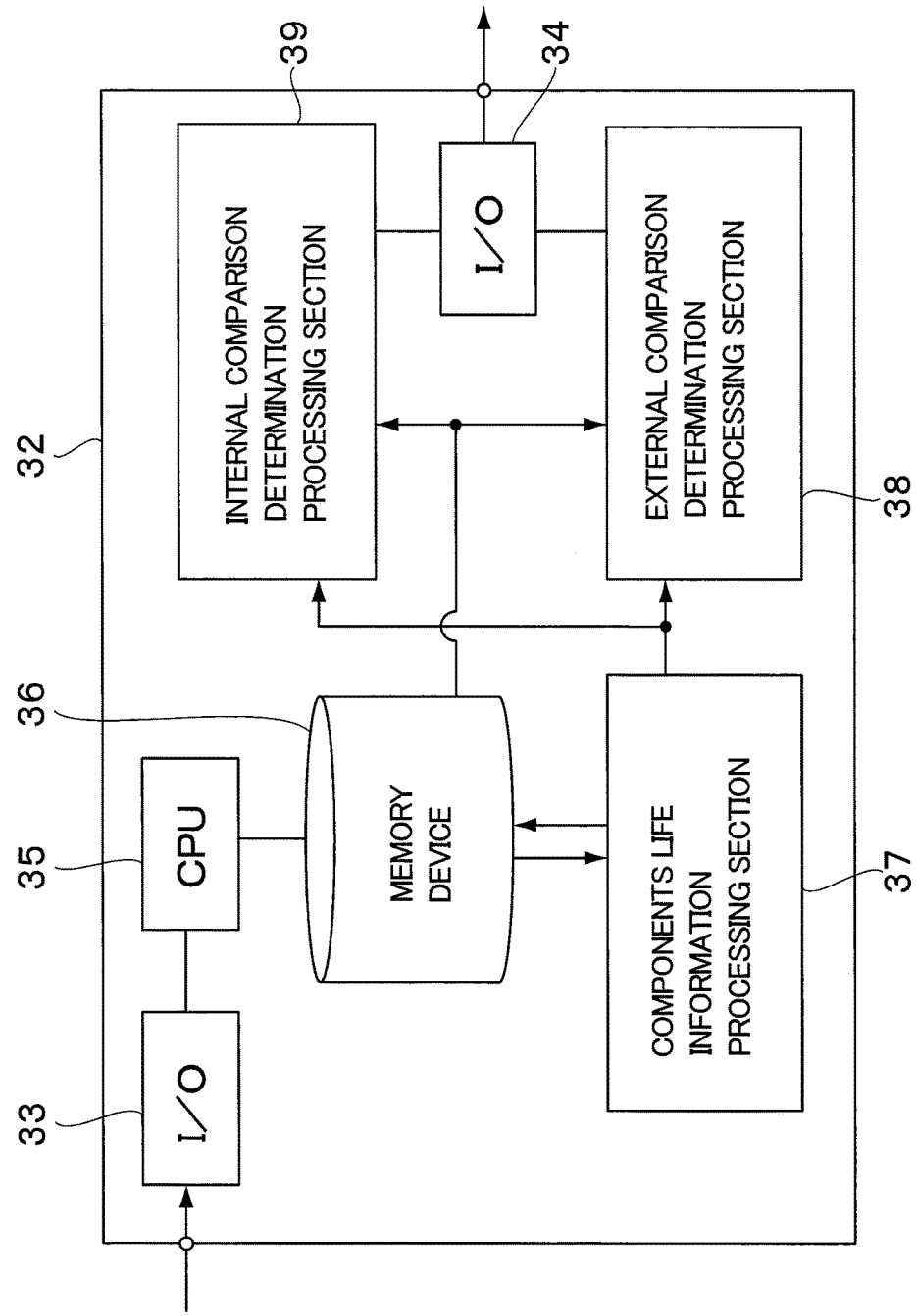
FIG. 4 is a block diagram showing a center server (management server).

Next, an explanation will be made of the center server 32 of the management center 31 with reference to FIG. 1 and FIG. 4 as well.

The center server 32 is configured of, for example, a server computer, a host computer, a main frame, and a large-sized computer of a general computer and the like. The center server 32 stores (reserves and accumulates) the operating information, the replaceable component information and the use environment information of the hydraulic excavator 1 as the information of each of the respective hydraulic excavators 1. In addition, the center server 32 outputs (transmits) a data report (a daily report and written report) in which these pieces of information are listed all together (as a list table) to the internal computer 42, the user-side computer 43 and the computer 47 for maintenance.

The data report can be received by persons requiring the data report, for example, employees of a manufacturer of the hydraulic excavator 1, users of the hydraulic excavator 1, persons in charge of services and the like. That is, persons requiring the data report are connected to the center server 32 using the computers 42, 43, 47. The data report is outputted to the computers 42, 43, 47 on a condition of input of a password or the like (access and acquisition of the data report are made possible). In addition, the data report may be configured to be regularly (for example, every day, every week and every month) outputted to persons requiring the data report by email transmission, for example.

Further, the center server 32 predicts the replacement time of the replaceable component of the hydraulic excavator 1, that is, a maintenance target component requiring the replacement upon coming to the end of its life. The predicted replacement time is provided to a person requiring the information, for example, being included in the data report or independently as replacement time predicting information (is outputted to the computers 42, 43, 47).

Here, Patent Document 1 describes the technology of predicting the replacement time of the replaceable component (maintenance target component) using the operating information (a pilot pressure, a pump pressure, a hydraulic oil temperature, an engine operating time and an engine rotational speed) of the hydraulic excavator 1 and the replaceable component information (a replaceable component name and a replacement date). On the other hand, in the present embodiment, not only the operating information and the replaceable component information used in Patent Document 1 but also the use environment information as the operator information in addition to the operating information and the replaceable component information are used to predict the replacement time of the replaceable component.

That is, the prediction of the replacement time of the replaceable component can be made more finely and more accurately by considering the characteristic (working characteristic) by the use environment (use aspect) of the hydraulic excavator 1. An example of the characteristic by the use environment may include a working characteristic for each operator of the hydraulic excavator 1, a working characteristic for each user of the hydraulic excavator 1, a working characteristic for each business category of a user, a working characteristic for each area of a user, a working characteristic for each working content (a construction content and a working content) of the hydraulic excavator 1, a working characteristic for each working area, and the like. For example, the characteristic for each operator differs in a pump pressure, in a hydraulic oil temperature and the like due to a difference in an engine rotational speed to be adjusted by an operator, and the like even in the same working. In addition, this difference causes a difference in a load quantity (a total thermal load quantity or total pump load quantity) given to the replaceable component (for example, the hydraulic hose). That is, a difference in the pump pressure, the hydraulic oil temperature or the like for each operator affects a life (replacement time) of the replaceable component. Therefore, it is necessary to consider the working characteristic for each operator for calculating the life of the replaceable component. Therefore, in the first embodiment, the life of the replaceable component is predicted by considering the history of the operator (working characteristic for each operator).

Therefore, the center server 32 includes input/output interfaces 33, 34, a CPU 35, the memory device 36 composed of a large capacity memory medium of an HDD (hard disc drive) and the like to form a data base, a component life information processing section 37, an external comparison determination processing section 38 and an internal comparison determination processing section 39, for example. The input/output interface 33 is for connection to the controller 24 of the hydraulic excavator 1, the computer 47 for maintenance and the like. The center server 32 receives transmission (input) of information of the hydraulic excavator 1 from the controller 24 or the computer 47 through the input/output interface 33. Specifically, the center server 32 regularly (for example, in a given time once a day) receives input of the operating information and the use environment information of the hydraulic excavator 1 together with the body information.

In addition, when the replaceable component of the hydraulic excavator 1 is replaced, the replaceable component information is transmitted (input) to the center server 32 from the computer 47 for maintenance and the like by an operation of a person in charge of services, for example. The information transmitted to the center server 32 is sequentially stored in the memory device 36. Further, a processing program for executing a processing flow shown in FIG. 6 to be described later and the corresponding relation between the identification information of the portable device 27 and the operator information (use environment information), and the like are preliminarily stored in the memory device 36.

Here, the body information is information for specifying (identifying) the hydraulic excavator 1, which includes at least one of a model, a type, a model number, an identification number of the hydraulic excavator 1, for example. The operating information of the hydraulic excavator 1 is similar to the operating information of Patent Document 1, for example. That is, the operating information is information of a state amount and a operating time changing when the hydraulic excavator 1 is working (operating). The operating information is information including a detection value (detection value detected by each of sensors 14, 15, 17, 19, 21, 22, 23) of each of components of the hydraulic excavator 1 and a operating time of the hydraulic excavator 1.

More specifically, the operating information includes at least one detection value of a pilot pressure of the working, a pilot pressure of the revolving, a pilot pressure of the traveling, a pump pressure, a hydraulic oil temperature and an engine rotational speed, and an engine operating time as the operating time and/or a time of an hour meter. On the other hand, in the first embodiment, the use environment information includes the operator information about who an operator operating the hydraulic excavator 1 is. The operator information includes, for example, at least one of an operator name, sex of an operator, an age of an operator, an organization name of an operator and a nationality of an operator. The replaceable component information is replacement information of the replaceable component. The replaceable component information includes, for example, a date of replacing the replaceable component as a use start day of the replaceable component, and a name of the replaceable component (replaceable component name). It should be noted that before the replacement of the replaceable component is implemented after the hydraulic excavator 1 is shipped, for example, a date when the hydraulic excavator 1 is shipped as a new product (new vehicle) or a date when the hydraulic excavator 1 is delivered to a user is preliminarily stored in the memory device 36. The shipping date or the delivery date becomes an initial value of the date of the replaceable component (a use start date of the replaceable component).

The CPU 35 stores and accumulates the input information in the memory device 36 for each hydraulic excavator 1 or for each information. Here, the use environment information is input to the center server 32 as the identification information of the portable device 27 read out in the RFID readout device 26. The CPU 35 automatically converts the input identification information into the operator information of the hydraulic excavator 1 based upon the corresponding relation between the identification information of the portable device 27 preliminarily registered in the memory device 36 and the operator information corresponding to the identification information. The CPU 35 stores and accumulates the converted operator information in the memory device 36.

Further, the CPU 35 processes the information stored in the memory device 36. The CPU 35 composes the data report collecting up these pieces of information, for example. The CPU 35 stores the data report in the memory device 36. On the other hand, the component life information processing section 37 predicts the replacement time of the replaceable component in the hydraulic excavator 1 based upon the information (body information, operating information and use environment information) stored in the memory device 36. The replacement time of the replaceable component predicted in the component life information processing section 37 is also associated with the replaceable component name to be stored in the memory device 36. In this case, the information of the replaceable component name and the replacement time can be stored in the memory device 36 as included in the data report or independently as replacement time predicting information.

Further, the center server 32 outputs (transmits) the data report including the replaceable component name and the replacement time and/or the replacement time predicting information to the internal computer 42 and the user-side computer 43 through the input/output interface 34. In this case, the external comparison determination processing section 38 and the internal comparison determination processing section 39 select information necessary out of the pieces of the information stored and accumulated in the memory device 36, and outputs the selected information to the internal computer 42 and the user-side computer 43.

For example, the external comparison determination processing section 38 determines whether or not the component life calculated in the component life information processing section 37 has come to the preliminarily set time or the end of the life. When the external comparison determination processing section 38 determines that the component life has come to the preliminarily set time, the effect is transmitted to the user-side computer 43 as the data report or as the replacement time predicting information, for example.

The internal comparison determination processing section 39 determines whether or not the component life calculated in the component life information processing section 37 has come to the preliminarily set time or the end of the life. When the internal comparison determination processing section 39 determines that the component life has come to the preliminarily set time, the effect is transmitted to the internal computer 42 together with information transmitted to the user-side computer 43 in the external comparison determination processing section 38.

In this way, in the embodiment, the center server 32 includes the operating information memory section (memory device 36) for storing the operating information including the detection value and the operating time of each component in the hydraulic excavator 1. In addition, the center server 32 includes the replaceable component information memory section (memory device 36) for storing the replaceable component information including the use start date of the replaceable component in the hydraulic excavator 1. In addition, the center server 32 includes the use environment memory section (memory device 36) for storing the operator information (operator history) which is one of the use aspects of the hydraulic excavator 1, which is information different from the operating information and the replaceable component information, as the use environment information. In addition, the center server 32 includes the replacement time predicting section (component life information processing section 37) for predicting the replacement time of the replaceable component using the use environment information together with the operating information and the replaceable component information. Further, the center server 32 includes the replacement predicting information output section (the external comparison determination processing section 38 and the internal comparison determination processing section 39) for outputting the replacement time predicted by the replacement time predicting section as the replacement predicting information of the replaceable component.

In this case, the hydraulic excavator 1 is provided with the RFID readout device 26 that reads out the identification information of the portable device 27 for recording specific identification information (an identification number, an identification code and an ID not overlapped for specifying the use environment information). The use environment memory section (memory device 36) is configured to store the operator information as at least one of the use aspects corresponding to the identification information of the portable device 27 read out by the RFID readout device 26 as the use environment information. It should be noted that the processing in FIG. 6 to be executed by the center server 32 will be described later.

Next, an explanation will be made of the prediction of the replacement time of the replaceable component to be performed in the component life information processing section 37 with reference to FIG. 7 to FIG. 10.

The component life information processing section 37 as the replacement time predicting section predicts (calculates) the replacement time of the replaceable component based upon a present degree (degradation degree) of the progress of the life of the replaceable component calculated using the operating information and the replaceable component information and a future degree (degradation degree) of the progress of the life of the replaceable component calculated using the operating information and the use environment information. That is, for the calculation of the replacement time of the replaceable component, it is necessary to consider two points of "calculation about how loads are applied on the replaceable component from a point after the mounting of the replaceable component to the present time and how much the life has progressed" and "calculation about how the hydraulic excavator 1 will be used in the future, how loads will be applied on the replaceable component and when the replaceable component comes to the life". The calculation about how much the life has progressed to the present time can be made based upon the data as a result of reading out a parameter affecting the life of the replaceable component from the operating information. On the other hand, the future progress of the life can be made by predicting the future operating information and loads to be applied on the component, based upon by whose operator the hydraulic excavator 1 has been used so far and under how many loads the hydraulic excavator 1 has worked.

Figure 10:
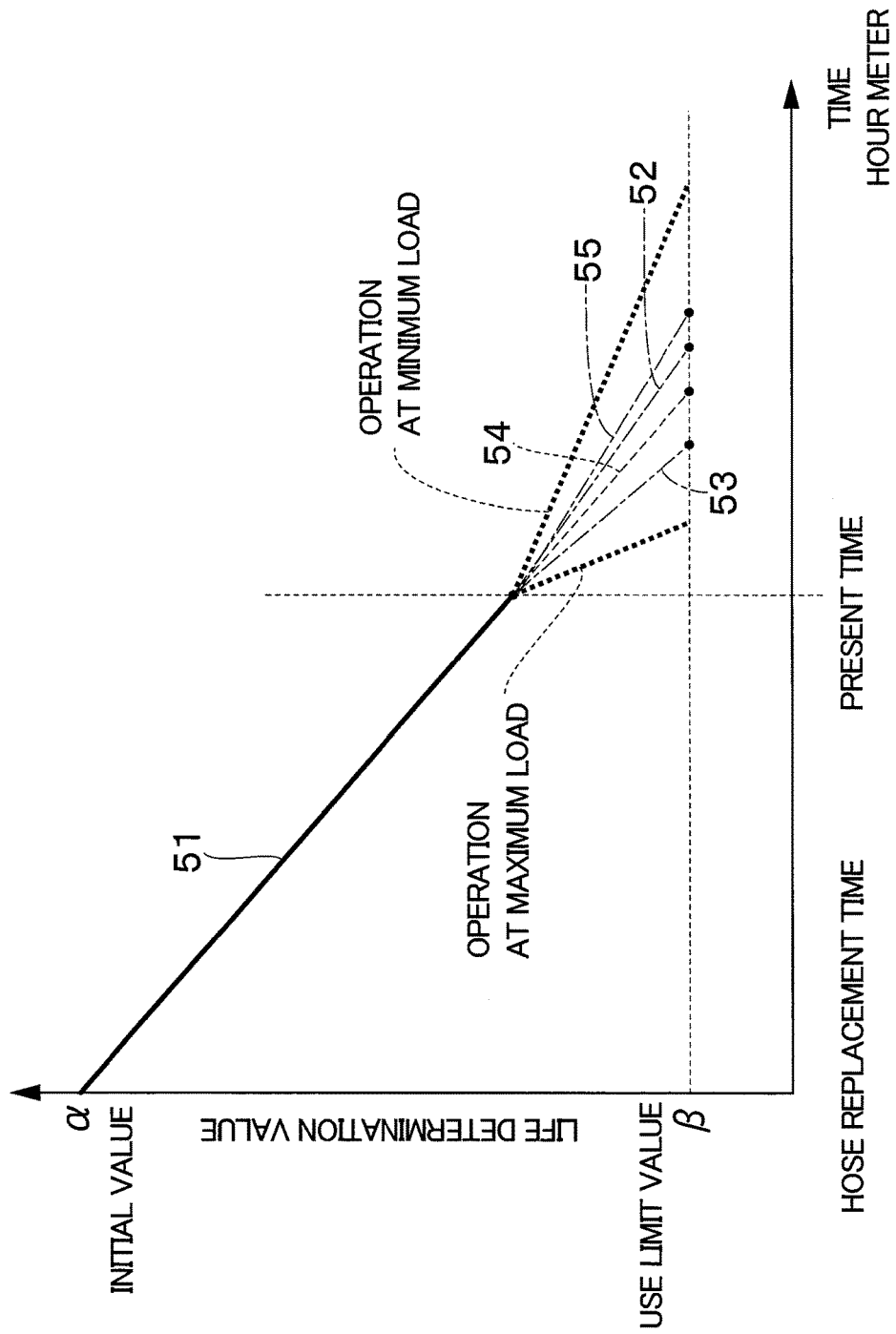
FIG. 10 is an explanatory diagram showing an example of calculating a life according to a first embodiment.

For example, in a case where a hydraulic hose is used as the replaceable component, the prediction (calculation) of the replacement time of the hydraulic hose will be explained. Here, the life of the hydraulic hose can be calculated as a period when a life determination value "y" expressed in the following formula 1 or a life determination value "Y" expressed in the following formula 2 is from an initial value "α" corresponding to a value at the time of a new component to a use limit value β corresponding to a value upon coming to the end of the life. It should be noted that the life of the hydraulic hose may be calculated using only any one or both of Formula 1 and Formula 2. In a case of using both, it is possible to adopt a value in which the life is calculated as shorter (the progress of the life is large). In addition, FIG. 10 shows an example of a relation between a change in the life determination value (y or Y), the initial value α and the use limit value β in a simplified manner.

$$y=-a \times b^c \times T+d \quad \text{[Formula 1]}$$

Figure 7:
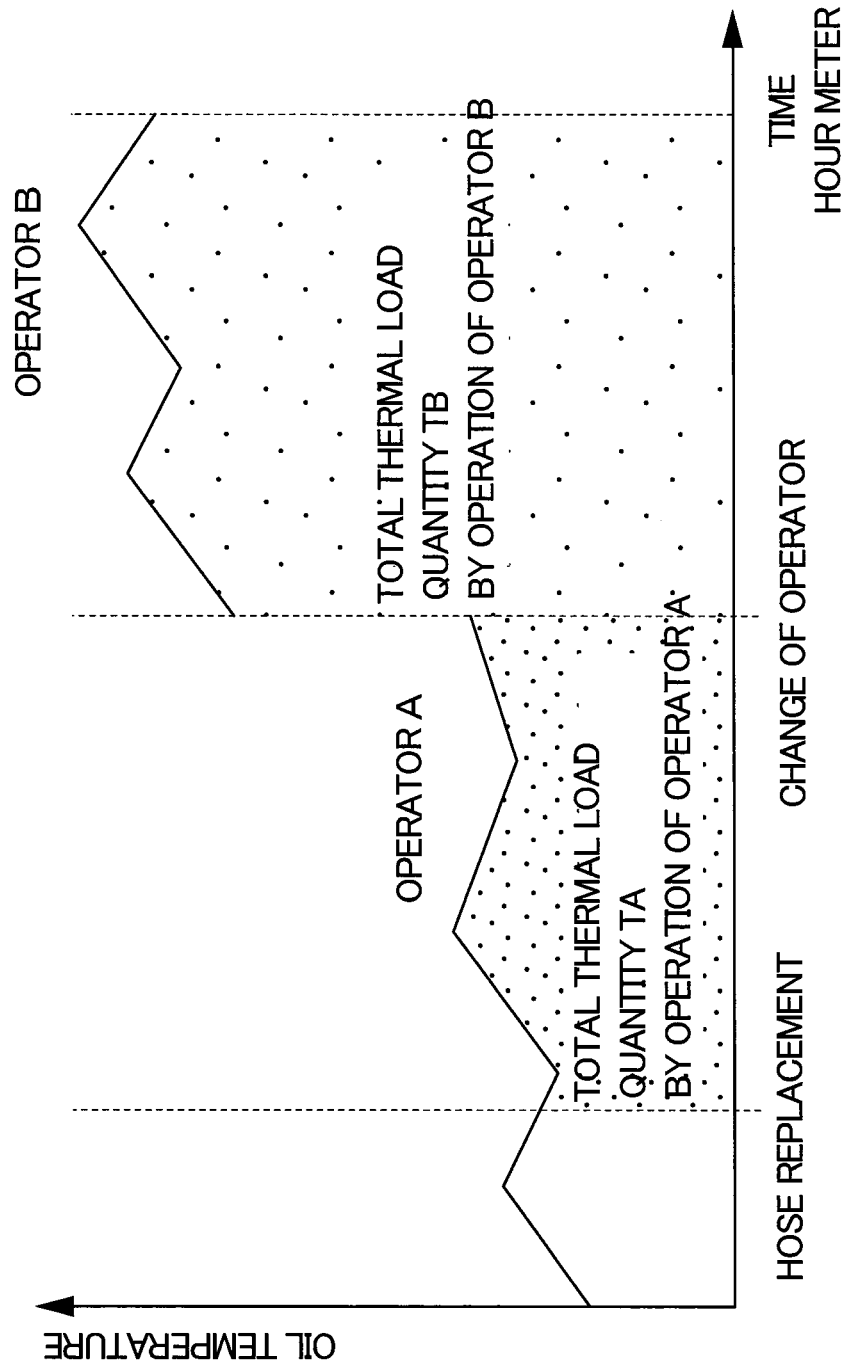
FIG. 7 is an explanatory diagram showing an example of a total heat quantity for calculating a life.

Formula 1 indicates a life determination value based upon a thermal load value. In Formula 1, T is indicative of a total thermal load quantity (° C.×h), and "a", "b", "c", "d" are indicative of constants respectively preliminarily found by experiments, simulations and the like. As shown in FIG. 7, the total thermal load quantity T can be found as an integrated value of hydraulic oil temperatures acquired from the operating information.

$$Y=-A \times B^C \times P+D \quad \text{[Formula 2]}$$

Figure 8:
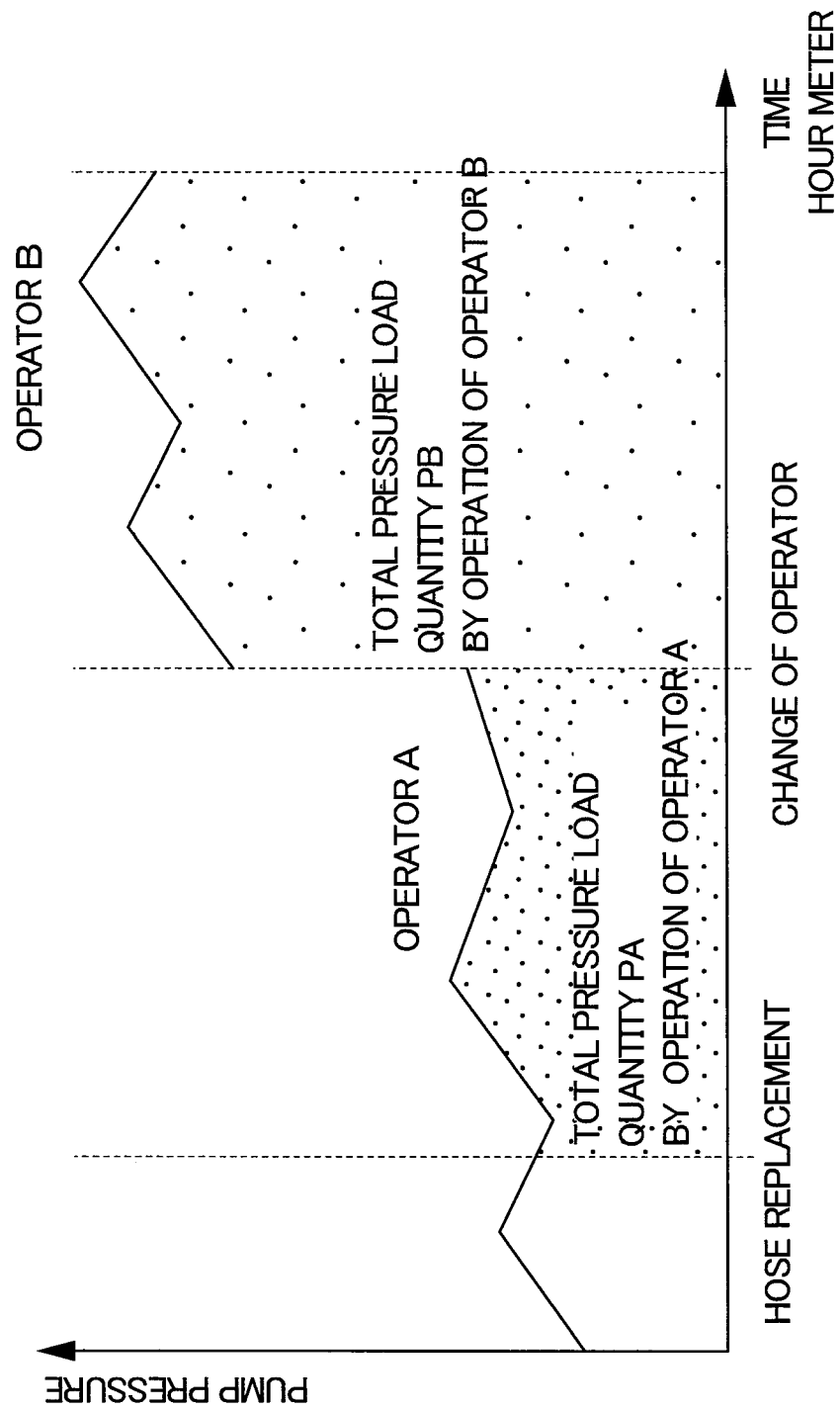
FIG. 8 is an explanatory diagram showing an example of a total pressure quantity for calculating a life.

Formula 2 indicates a life determination value based upon a pressure load value. In Formula 2, P is indicative of a total pump load quantity (MPa×h), and "A", "B", "C", "D" are indicative of constants respectively preliminarily found by experiments, simulations and the like. As shown in FIG. 8, the total pump load quantity (total pressure quantity) P can be found as an integrated value of pump pressures acquired from the operating information.

Here, how much the life of the hydraulic hose has progressed to the present time can be found by substituting the total thermal load quantity T from a time of attaching the hydraulic hose (a time of being a new component) to the present time in Formula 1. For example, the progress degree can be found by substituting both of a total thermal load quantity TA by an operation of an operator A and a total thermal load quantity TB by an operation of an operator B as shown in FIG. 7 in Formula 1. Thereby, for example, a characteristic line 51 expressed in a solid line in FIG. 10 can be acquired. It should be noted that in FIG. 10, the characteristic line 51 is indicated as an average line of the life progress.

In addition, how much the life of the hydraulic hose has progressed to the present time can be also found by substituting the total pump load quantity P from a time of attaching the hydraulic hose to the present time in Formula 2. For example, the progress degree can be found by substituting both of a total pressure load quantity PA by an operation of an operator A and a total pressure load quantity PB by an operation of an operator B as shown in FIG. 8 in Formula 2. In this case as well, the characteristic line 51 in FIG. 10 can be acquired, for example.

Figure 9:
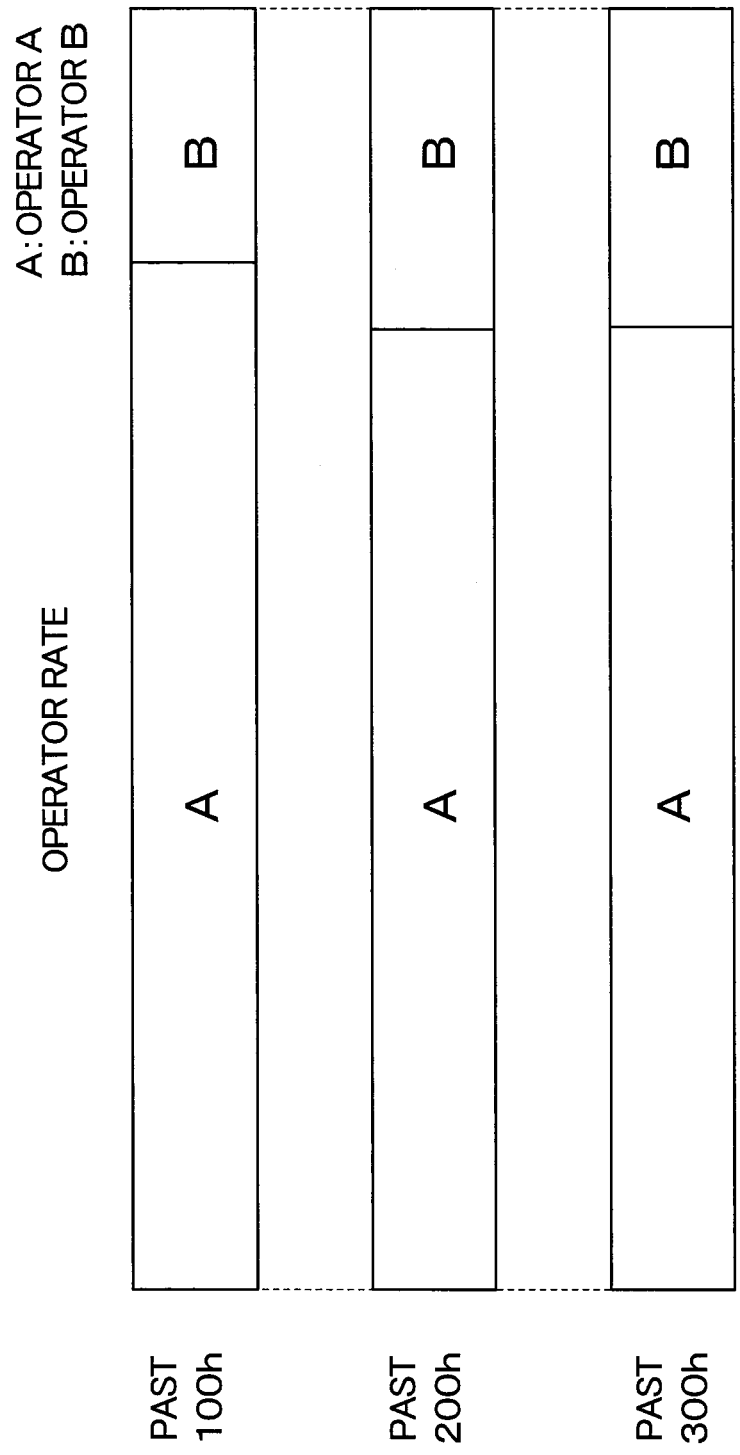
FIG. 9 is an explanatory diagram showing an example of a rate of an operator.

Next, the future progress of the life of the hydraulic hose will be found as follows. That is, a thermal quantity and/or a pressure quantity per section time is found based upon a total thermal quantity for each operator as shown in FIG. 7 and/or a total pressure quantity for each operator as shown in FIG. 8 and an immediate operator rate (operator operating rate) of the hydraulic excavator 1 as shown in FIG. 9. By substituting the value in Formula 1 and/or Formula 2, a characteristic line 52 or a characteristic line 53 in a dashed line in FIG. 10 can be acquired.

Here, the characteristic line 52 corresponds to the progress of the life in a case of assuming that the operation continues at the operator rate of the past 100 hours as shown in FIG. 9 in the future. The characteristic line 53 corresponds to the progress of the life in a case of assuming that the operation continues at the operator rate of the past 200 hours (past 300 hours) as shown in FIG. 9 in the future. In addition, calculating a time of the hour meter at the time of the use limit value β makes it possible to predict the replacement time of the replaceable component. It should be noted that in FIG. 10, a characteristic line 54 in a fine broken line corresponds to the progress of the life in a case of assuming that the life progresses in the same degree as from the hose replacement time to the present time. In this way, according to the first embodiment, by using the immediate operator information (operator rate) as the use environment information, it is possible to acquire the characteristic lines 52, 53, and it is possible to perform the more fine prediction and the more accurate prediction of the replacement time of the replaceable component.

Further, when information about the future operator operating the hydraulic excavator 1 is preliminarily acquired, the information of the operator can be reflected on the prediction of the life. That is, for example, in a case where it is apparent that only the operator A will operate in the future, a thermal quantity and/or a pressure quantity per section time by the operator A is found, which is substituted in Formula 1 and/or Formula 2, making it possible to acquire a characteristic line 55. Therefore, from this point as well, it is possible to perform the more fine prediction and the more accurate prediction of the replacement time of the replaceable component.

The replaceable component management system for the hydraulic excavator according to the present embodiment has the configuration as described above, and next, an operation thereof will be explained.

An operator of the hydraulic excavator 1 gets in the cab 7 to expose the portable device 27 on the RFID readout device 26. The controller 24 in the hydraulic excavator 1 stores (reserves) the identification information of the portable device 27 in the memory 24D as the use environment information, and permits a start of the engine 8. When the operator operates a start stop switch of a power switch or the like to activate the engine 8, the hydraulic pumps 9A, 9B are driven by the engine 8.

Thereby, the pressurized oil delivered from the hydraulic pumps 9A, 9B are delivered toward the various hydraulic actuators 4D, 4E, 4F, 2B, 2C, 5 in response to the lever operations of the control lever devices 10A, 10B, 11A, 11B provided in the cab 7. Thereby, the hydraulic excavator 1 can perform the traveling movement by the lower traveling structure 2, the revolving movement by the upper revolving structure 3, the excavating work by the working mechanism 4, and the like.

At this time, detection signals of the respective sensors 14, 15, 17, 19, 21, 22, 23 are input to the controller 24 in the hydraulic excavator 1. The controller 24 sequentially stores a pilot pressure of the working, a pilot pressure of the revolving, a pilot pressure of the traveling, a pump pressure, a hydraulic oil temperature and an engine rotational speed, and an engine operating time (or a time of an hour meter) in the memory 24D as the operating information, based upon the detection signals.

The operating information and the use environment information (identification information of the portable device 27) stored in the memory 24D are regularly (in a given time once a day, for example) transmitted to the center server 32 together with the body information. The center server 32 stores (reserves and accumulates) the received operating information and use environment information of the hydraulic excavator 1 as information of each of the respective hydraulic excavators 1. At this time, the use environment information is stored in the center server 32 as the operator information corresponding to the identification information of the portable device 27. In addition, when the replaceable component in the hydraulic excavator 1 is replaced, the replaceable component information is transmitted to the center server 32 from the computer 47 for maintenance and the like. The center server 32 stores also the replaceable component information as the information for each hydraulic excavator 1 in the same way as the operating information and the use environment information.

The center server 32 provides, for example, the data report collecting the pieces of the information (operating information, replaceable component information and use environment information) of the hydraulic excavator 1 to persons requiring the data report. For example, the data report is regularly outputted (transmitted) to the internal computer 42, the user-side computer 43 and the computer 47 for maintenance. Further, the center server 32 predicts the replacement time of the replaceable component using the operating information, the replaceable component information and the use environment information of the hydraulic excavator 1. The center server 32 provides the information of the predicted replacement time to the person requiring that information as included in the data report or independently as the replacement time predicting information (for example, outputs the information to the computers 42, 43, 47).

Figure 5:
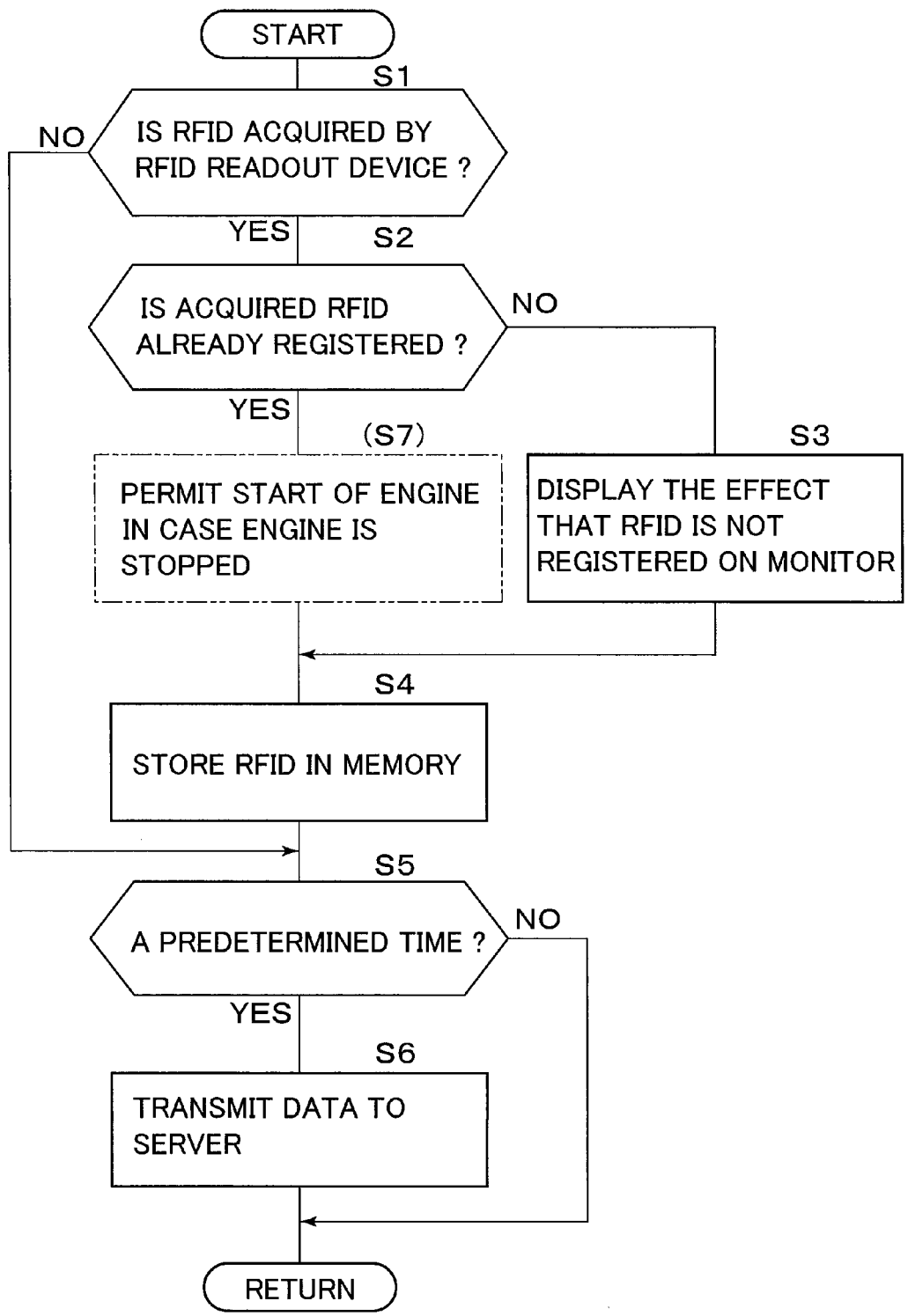
FIG. 5 is a flowchart showing processing of the controller in the hydraulic excavator.
Figure 6:
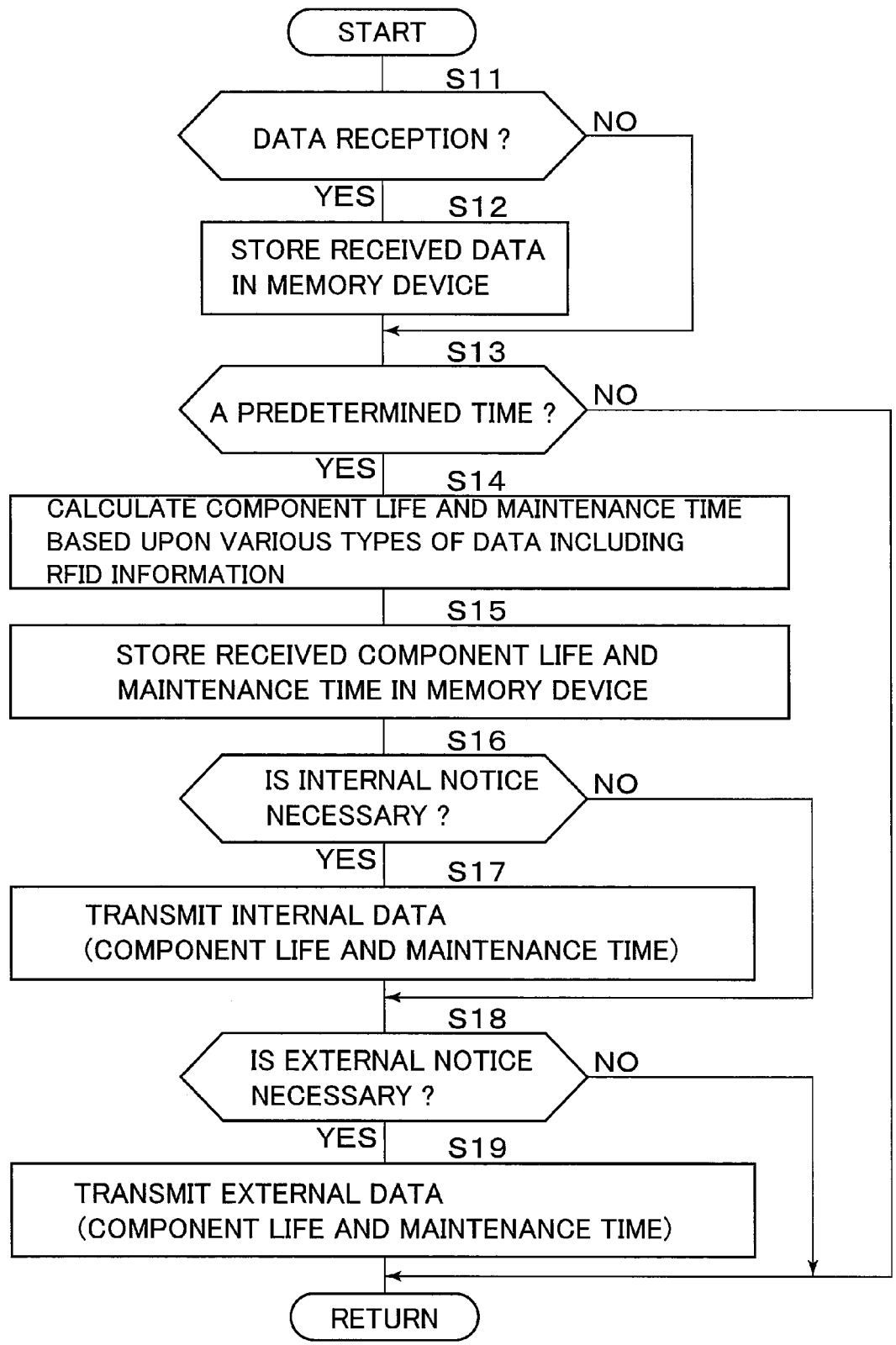
FIG. 6 is a flow chart showing processing of the center server (management server).

Next, an explanation will be made of the processing to be executed in the controller 24 in the hydraulic excavator 1 with reference to a flow diagram in FIG. 5. Here, the processing in FIG. 5 is repeatedly executed in a given control cycle during power supply to the controller 24, for example. In FIG. 5 and FIG. 6 to be described later, steps in the flow diagram are indicated at "S", and, for example, "S1" corresponds to step 1.

When the control processing in FIG. 5 is started by supplying power to the controller 24, at S1, it is determined whether or not the identification information of the portable device 27 is read out in the RFID readout device 26. In a case where "NO" determination is made at S1, that is, it is determined that the identification information is not read out, the process goes to S5. On the other hand, in a case where "YES" determination is made at S1, that is, it is determined that the identification information is read out, the process goes to S2. At S2, it is determined whether or not the read identification information is the preliminarily registered one.

In a case where "YES" determination is made at S2, that is, it is determined that the read identification information is the preliminarily registered one, the process goes to S4. Here, in a case of determining whether or not an activation (start of the engine 8) of the hydraulic excavator 1 is permitted based upon the identification information of the portable device 27, when at S2 "YES" determination is made, that is, the process goes to S7. At S7 the start of the engine 8 is permitted. That is, in a case where the engine 8 is stopped at the time of executing the processing at S7, the start of the engine 8 is permitted, and the process goes to S4. It should be noted that in a case where the engine 8 is already started, the process goes to S4 as it is (without doing anything) since the start is already permitted.

On the other hand, in a case where "NO" determination is made at S2, that is, it is determined that the read identification information is not the preliminarily registered one, the process goes to S3. At S3, the effect that the portable device 27 is not the registered one is displayed on a monitor provided near the operator's seat, and the process goes to S4.

At S4, the identification information of the portable device 27 is stored in the memory 24D, and the process goes to S5. At S5, it is determined whether or not a given time has elapsed (or whether or not it has come to a preliminarily set given time). That is, at S5 it is determined whether or not a given time has elapsed after the previous processing at S6 is executed. Specifically, at S5, it is determined whether or not a given time (for example, one day) has elapsed after transmitting the operating information and the use environment information (identification information of the portable device 27) stored in the memory 24D together with the body information. The given time can be preliminarily set to be an appropriate time as a time of regularly transmitting the operating information to the center server 32.

In a case where "YES" determination is made at S5, that is, in a case where it is determined that the given time has elapsed, the process goes to S6, transmitting the data. That is, at S6, the operating information and the use environment information (identification information of the portable device 27) stored in the memory 24D are transmitted to the center server 32 together with the body information. In a case where the transmission to the center server 32 is made at S6 or in a case where "NO" determination is made at S5, the process returns (back to START, and the processing after S1 is repeated).

Next, an explanation will be made of the processing to be executed in the center server 32 with reference to a flow diagram in FIG. 6. Here, the processing in FIG. 6 is repeatedly executed in a given control cycle during power supply to the center server 32, for example.

When the control processing in FIG. 6 is started by power supply to the center server 32, it is determined whether or not the data is received at S11. That is, at S11, it is determined whether or not the operating information, the use environment information (identification information of the portable device 27) and the replaceable component information are received from the controller 24 in the hydraulic excavator 1 and/or the computer 47 for maintenance. When "YES" determination is made at S11, that is, when it is determined that the data is received, the process goes to S12, wherein the data is stored in the memory device 36. That is, at S12, the operating information, the use environment information and the replaceable component information corresponding to the received data are stored in the memory device 36. At this time, the use environment information is automatically converted into the operator information corresponding to the identification information from the identification information of the portable device 27 for storage.

In a case where the received data is stored in the memory device 36 at S12 or in a case where "NO" determination is made at S11, the process goes to S13, wherein it is determined whether or not a given time has elapsed (whether or not it has come to a preliminarily set given date and time). That is, at S13, it is determined whether or not a given time has elapsed after executing the processing at S14 and at 15 at the previous time. Specifically, at S13, the replacement time of the replaceable component is predicted, and it is determined whether or not a given time (for example, one day, one week, one month) has elapsed after storing the result in the memory device 36. The given time (given day and time) can be preliminarily set to be an appropriate time as a time of regularly predicting the replacement time of the replaceable component.

In a case where "YES" determination is made at S13, that is, in a case where it is determined that the given time has elapsed, the process goes to S14. On the other hand, in a case where "NO" determination is made at S13, that is, in a case where it is determined that the given time has not elapsed, the process returns (back to START, and the processing after S11 is repeated) without executing the processing after S14. At S14, the replacement time of the replaceable component (a degree of the progress of the life of the replaceable component and a maintenance time as a time coming to the end of the life) is calculated based upon the operating information, the use environment information and the replaceable component information to the present time stored in the memory device 36. In this case, the replacement times of all the replaceable components may be calculated or the replacement time of only the replaceable component close to the replacement time may be calculated. In any case, when the replacement time of the replaceable component is calculated at S14, the process goes to S15, wherein the calculation result at S14 is stored in the memory device 36.

The processing after subsequent S16 is processing in which the replacement time of the replaceable component is coming near or the like, and it is determined whether or not the notice of the effect is necessary, and in a case where it is determined that the notice is necessary, the effect (the effect that the replacement time is coming near) is noticed. First, at S16, it is determined whether or not the internal notice of a manufacturer is necessary. That is, in a case where the replacement time of the replaceable component is coming near, a preparation for manufacture of the replaceable component or the like is necessary in the company. Therefore, at S16, it is determined whether or not the internal notice is necessary in consideration of a time required for the preparation and the replacement time.

In a case where it is determined that "YES" determination is made at S16, that is, in a case where it is determined that the internal notice is necessary, the process goes to S17, wherein the internal notice is made. For example, the internal data report including the replacement time calculated at S14, an attention to the effect that the replacement time is coming near, and the like is outputted to the internal computer 42. In addition, an email of the effect that the replacement time is coming near can be outputted (transmitted) to a person in charge of a preparation for the replaceable component. In a case of making the internal notice at S17 or in a case where "NO" determination is made at 16, the process goes to S18.

At S18, it is determined whether or not the notice toward a user using the hydraulic excavator 1 is necessary. That is, at the time of replacing the replaceable component, it is necessary for a user to transport the hydraulic excavator 1 to a maintenance factory or the like, for example. In addition, until the replacement is completed, a user cannot use the hydraulic excavator 1. Therefore, the user needs a preliminary adjustment for replacing the replaceable component. Therefore, at S18, it is determined whether or not the internal notice is necessary in consideration of a time required for the preliminary adjustment and a replacement time.

In a case where it is determined that "YES" determination is made at S18, that is, in a case where it is determined that the external notice is necessary, the process goes to S19, wherein the external notice is made. For example, the external data report including the replacement time calculated at S14, an attention to the effect that the time is coming near, and the like is outputted to the user-side computer 43. In addition, an email to the effect that the replacement time is coming near can be outputted (transmitted) to a user. Further, an email to the effect that the replacement time is coming near may be outputted (transmitted) to a person in charge of services (person in charge of maintenance) who performs the replacement of the replaceable component, as needed. In a case of making the external notice at S19 or in a case where "NO" determination is made at 18, the process returns.

(1) In this way, according to the embodiment, the center server 32 (component life information processing section 37) as the replacement time predicting section predicts the replacement time of the replaceable component using the use environment information in addition to the operating information and the replaceable component information by the processing of S14 in FIG. 6. Therefore, a history (history of the operator) of a use aspect of the hydraulic excavator 1, the future use aspect (immediate operator rate) supposed from the history and the like can be considered for the prediction of the replacement time of the replaceable component. That is, it is possible to predict a life of the replaceable component and a replacement time (maintenance timing) of the replaceable component in consideration of load frequency and use characteristics for each operator. In other words, it is possible to predict the replacement time in consideration of a load to each component of the hydraulic excavator 1 differing depending on each of the operators. Therefore, more fine prediction and more accurate prediction can be made. In addition, for example, since it is possible to evaluate fuel consumption and a habit at the operation for each operator from the operating information and the use environment information as needed, the feedback thereof can be provided to an operator. In this case, the fuel consumption can be improved, for example, by the operator's correcting a way of the operation or the like.

(2) According to the embodiment, the center server 32 (component life information processing section 37) as the replacement time predicting section, as explained using FIG. 10, predicts the replacement time (a time of the hour meter reaching the use limit value $\beta$) of the replaceable component. That is, the center server 32 predicts the replacement time of the replaceable component based upon the present degree (characteristic line 51) of the progress of the life of the replaceable component calculated using the operating information and the replaceable component information and the future degree (characteristic lines 52, 53, 55) of the progress of the life of the replaceable component calculated using the operating information and the use environment information. Therefore, the future use aspect (immediate operator rate) supposed from the history (history of an operator) of the use aspect of the hydraulic excavator 1 or the like can be considered for calculation of the future degree of the progress of the life. As a result, the future degree of the progress of the life can be predicted more finely and more accurately.

(4) According to the embodiment, the hydraulic excavator 1 is provided with the RFID readout device 26 as the readout device. In addition, at least one (operator information) of use aspects corresponding to the identification information of the portable device 27 read out by the RFID readout device 26 is stored as use environment information in the memory device 36 in the center server 32 as the use environment memory section. Therefore, an operator can make the memory device 36 in the center server 32 automatically store the use environment information (operator information) corresponding to identification information of the portable device 27 by causing the RFID readout device 26 to read out the identification information of the portable device 27. As a result, it is possible to reduce the labors required for storing the use environment information in the memory device 36.

(5) According to the embodiment, the controller 24 in the hydraulic excavator 1 determines whether or not the activation of the hydraulic excavator 1 is permitted based upon the identification information of the portable device 27 read out in the RFID readout device 26 by the processing (activation determining section) at S2 and S7 in FIG. 5. Therefore, an operator can execute both of the working for activating the hydraulic excavator 1 and the working for storing the use environment information in the memory device 36 in the center server 32 by causing the RFID readout device 26 to read out the identification information of the portable device 27. Thereby, the working for storing the use environment information in the memory device 36 is not necessary to be executed separately from the working for activating the hydraulic excavator 1, and from this point of view as well, it is possible to cut down on labor.

Next, FIG. 11 shows a second embodiment of the present invention. The second embodiment is characterized in that the use environment information is defined as a user (use company) of the construction machine. It should be noted that in the second embodiment, components identical to those in the first embodiment are referred to as identical reference numbers, and an explanation thereof is omitted.

For example, there is considered a rental business (rental company) that has a plurality of hydraulic excavators 1, which are rented to construction businesses (construction companies) performing works such as civil engineering works, construction works, demolition works, dredging works and the like. In this case, the rental business can manage loads to be given to the hydraulic excavator 1 for each construction business as a rental destination. For example, the prediction of the replacement time of the replaceable component can be made in consideration of a load quantity (a total thermal load quantity and total pump load quantity) of the present replaceable component (for example, a hydraulic hose) attached on the hydraulic excavator 1 at the rental time of the hydraulic excavator 1, a rental period thereof, and a working characteristic for each of construction businesses acquired to the present time. In this case, it is possible to suppress the event that the replacement time (maintenance time) comes, that is, the replacement work of the replaceable component (repair of the hydraulic excavator 1) becomes necessary during the renting period of the hydraulic excavator 1.

That is, the rental business of the hydraulic excavator 1 inputs (stores and reserves) a construction business as a user as the use environment information in the center server 32 (in the memory device 36 thereof) using the user-side computer 43 or the like for each time of renting the hydraulic excavator 1, for example. It should be noted that a corresponding relation between the identification information of the portable device 27 and the user (construction business) may be preliminarily registered in the center server 32 (in the memory device 26 thereof). In this case, the user (construction business) corresponding to the identification information of the portable device 27 read out in the RFID readout device 26 is stored in the memory device 36 in the center server 32 as the use environment information. In any case, the information of the user (construction business) of the hydraulic excavator 1 as the use environment information is accumulated in the center server 32 (in the memory device 36 thereof) (the history of the user is reserved).

Next, an explanation will be made of the prediction (calculation) of the replacement time of the hydraulic hose with reference to FIG. 11.

First, how much the life of the hydraulic hose has progressed to the present time can be found by substituting a total thermal load quantity T and/or a total pump load quantity P acquired from the operating information to the present time in Formula 1 and/or Formula 2 as mentioned before. Thereby, for example, a characteristic line 61 expressed in a solid line in FIG. 11 can be acquired. Next, the progress of the life of the hydraulic hose in the future can be found by substituting a thermal quantity and/or a pressure quantity per section time of each of construction businesses (A company and B company) acquired from the operating information and the use environment information to the present time in Formula 1 and/or Formula 2. Thereby, for example, a characteristic line 62 or a characteristic line 63 expressed in a dashed line in FIG. 11 can be acquired.

Here, the characteristic line 62 corresponds to the progress of the life in a case of assuming of being rented to A company from the present time. The characteristic line 63 corresponds to the progress of the life in a case of assuming of being rented to B company from the present time. In addition, by calculating a time of the hour meter at the time of reaching the use limit value β, it is possible to predict the replacement time of the replaceable component for each construction business.

The second embodiment is configured such that as mentioned above, the user of the hydraulic excavator 1 is defined as the use environment information to predict the replacement time of the hydraulic hose as the replaceable component, and is not particularly different in a basic function from that according to the first embodiment as described above.

Particularly, in the second embodiment, it is possible to predict the life of the replaceable component and the replacement time (maintenance timing) of the replaceable component in consideration of the load frequency and use characteristic for each user (construction business). That is, since the working content, the operator and the like in the hydraulic excavator 1 owned by the rental business differ depending upon the user as the rental destination, the load to be given to the hydraulic excavator 1 also differs for each user. On the other hand, in the second embodiment, the replacement time can be predicted in consideration of the load differing depending upon their user to improve the prediction accuracy of the replacement time.

Further, in the second embodiment, it is possible to use the result of the prediction of the replacement time as follows, for example. That is, when a rental business receives a request (allocation) of a rental from a construction business (A company or B company), the rental business inputs information of the hydraulic excavator 1 scheduled for rental, the rental period and the rental destination (A company or B company) to the center server 32 from the user-side computer 43. At this time, the center server 32 finds loads given to the hydraulic excavator 1 by the rental destination (A company or B company) based upon the use environment information and the operating information to the present time.

The center server 32 predicts the replacement time with reference to the load, and determines whether or not there is a replaceable component necessary for replacement during the rental period. In addition, the center server 32 outputs (notifies) presence/absence of the replaceable component necessary for the replacement during the rental period and a name of the replaceable component necessary for the replacement to the user-side computer 43. The rental business preliminarily replaces the replaceable component necessary for the replacement during the rental period before the renting. In addition, it is possible to rent the hydraulic excavator 1 unnecessary for the replacement of the replaceable component during the rental period.

Further, when the hydraulic excavator 1 is returned, loads in a case of assuming that the hydraulic excavator 1 is rented to a rental destination supposed in the future for a predetermined rental period may be simulated. In this simulation, the replaceable component a life of which possibly progresses in a predetermined rate or more (replaceable component having a possibility that the replacement time will come in a shorter time than a predetermined period) may be outputted (notified). The predetermined rental period, the predetermined rate, the predetermined period can be optionally set. In any case, the convenience of the rental business and the construction business of the hydraulic excavator 1 can improve.

Next, FIG. 12 shows a third embodiment of the present invention. The third embodiment is characterized in that the use environment information is defined as a working content of the construction machine and the replaceable component is defined as a filter. It should be noted that components in the third embodiment identical to those in the first embodiment are referred to as identical reference numbers, and an explanation thereof is omitted.

In the third embodiment, a user of the hydraulic excavator 1 inputs (stores and reserves) a working content of the hydraulic excavator 1 as use environment information to the center server 32 (in the memory device 36 thereof) using the user-side computer 43 and the like. The working content is a construction content (working content) to be executed by the hydraulic excavator 1, and an example thereof may include civil engineering works, construction works, demolition works, dredging works and the like. Thereby, information of the working content (construction content) of the hydraulic excavator 1 as the use environment information is accumulated in the center server 32 (in the memory device 36 thereof) (a history of the working content is reserved). It should be noted that the working content (construction content) corresponding to the identification information of the portable device 27 read out in the RFID readout device 26 may be configured to be stored in the memory device 36 as the use environment information.

In this case, a manufacturer (maker) of the hydraulic excavator 1 prepares for a plurality of portable devices 27 for each working content (each construction content). An operator of the hydraulic excavator 1 causes the RFID readout device 26 to read out the portable device 27 corresponding to the then-working content out of the plurality of portable devices 27 and starts the engine 8. Further, the working content may be incorporated in the information of the user (use company) of the hydraulic excavator 1. For example, the user and the working content may be managed (registered) in different portable devices 27 (by identification information thereof). In addition, the user and the working content may be managed (registered) in a single portable device 27 (by identification information thereof).

Next, an explanation will be made of prediction (calculation) of a replacement time of the filter with reference to FIG. 12.

A use limit of a filter is generally determined by a clogging amount of the filter (hereinafter, a load of the filter). The load of the filter can be predicted from a filtered amount and a dirt degree of a target material for filtering. The filtered amount can be found from a fuel use quantity in a case of using a fuel filter. The filtered amount in a case of an air filter of the engine 8 can be found from an intake quantity of air. The filtered amount in a case of an oil filter of the engine 8 can be found from an engine oil quantity circulated in the engine as a delivery flow quantity of an oil pump in the engine 8. The filtered amount in a case of a hydraulic oil filter (full-flow filter) can be found from a delivery flow quantity of the hydraulic pumps 9A, 9B. The intake quantity of air, the delivery flow quantity of the oil pump and the delivery flow quantity of the hydraulic pumps 9A, 9B can be respectively calculated because of proportion to a rotational speed of the engine 8.

On the other hand, the dirt degree of the target object for filtering can predict a mixing degree of impurities from the information of the construction content of the hydraulic excavator 1 such as civil engineering, demolition, and the like. For example, as explained in the air filter of the engine 8, in the demolition work, powder dusts of demolished materials are mixed into air, and in the civil engineering work, powder dusts of sand and earth are mixed into air. In addition, the mixing degree of the powder dusts into the air is larger in the demolition work than in the civil engineering work (the dirt degree is larger), for example. Hereinafter, determined that the demolition work provides a more severe environment for the air filter than the civil engineering work, the replacement time of the air filter is predicted.

First, how much the life of the air filter has progressed to the present time is calculated from the operating information and the use environment information (working content) to the present time. In this case, an intake quantity of air as the filtered amount can be calculated based upon a history of the rotational speeds of the engine 8 from the operating information to the present time. In addition, a load as a life determination value of the air filter is calculated by multiplying the intake quantity by a coefficient (gains or parameters) corresponding to the dirt degree (construction content) of the target object for filtering.

For example, the progress of the life in a case of operating in an environment having a small load is defined as a characteristic line 71 in FIG. 12. On the other hand, in a case of executing the demolition work in which impurities (powder dusts) are more likely to be mixed, the characteristic line 71 as a reference is multiplied by an inclination of A times. The characteristic line 72 acquired thereby corresponds to the progress of the life in the demolition work. On the other hand, in a case of executing the civil engineering work in which impurities (powder dusts) are less likely to be mixed, the characteristic line 71 as a reference is multiplied by an inclination of B times a value of which is smaller than A. The characteristic line 73 acquired thereby corresponds to the progress of the life in the civil engineering work.

Here, a relation of A and B is A>B. A and B can be set by collecting and analyzing the air filter having worked for a regular time for each construction content and each business category. Specifically, A and B can be set by analyzing the clogging of the air filter for each construction content and each business and considering an inclination of the load corresponding to the clogging for each construction content and each business category. In addition, whether the progress of the life in the present time corresponds to the characteristic line 72 or the characteristic line 73 is determined from the use environment information (working content) to the present time. That is, when the use environment information (working content) to the present time is the demolition work, the progress of the life to the present time can be made to the characteristic line 72, and when it is the civil engineering work, the progress of the life to the present time can be made to the characteristic line 73.

Next, the progress of the life of the air filter in the future is calculated considering how the hydraulic excavator 1 will used in the future from the operating information to this point and how the intake quantity of air will change from the rotational speed of the engine 8 in this case. Specifically, the progress of the life of the air filter in the future can be found as a characteristic line corresponding to the future construction content. For example, in a case where the construction content to the present time is the demolition work and the demolition work continues to be executed in the future, a characteristic line 74 can be acquired. In a case where the construction content to the present time is the demolition work and the civil engineering work will be executed in the future, a characteristic line 75 can be acquired. On the other hand, in a case where the construction content to the present time is the civil engineering work and the civil engineering work continues to be executed in the future, a characteristic line 76 can be acquired. In a case where the construction content to the present time is the civil engineering work and the demolition work will be executed in the future, a characteristic line 77 can be acquired. In addition, by calculating a time of an hour meter at the time of reaching a load limit value γ, the replacement time of the replaceable component can be predicted.

The third embodiment is configured to define the working content (construction content) of the hydraulic excavator 1 as the use environment information as described above, and predict the replacement time of the filter (air filter) as the replaceable component, and does not differ particularly in the basic function from the aforementioned first embodiment.

(3) Particularly, according to the third embodiment, the center server 32 (component life information processing section 37) as the replacement time predicting section, as explained using FIG. 12, calculates the present degree (characteristic line 72 or characteristic line 73) of the progress of the life of the filter (air filter) as the replaceable component using the use environment information in addition to the operating information and the replaceable component information. Therefore, the present degree of the progress of the life can be calculated with higher accuracy by considering the history of the use aspect (the history of the working content) of the hydraulic excavator 1 for the calculation of the present degree of the progress of the life. That is, when the working content to the present time is the demolition work, the characteristic line 72 can be acquired, and when the working content to the present time is the civil engineering work, the characteristic line 73 can be acquired. The present life can be calculated with higher accuracy by using the characteristic line 72 and the characteristic line 73 corresponding to the use environment information (working content), and accuracy in the calculation of the future degree of the progress of the life, finally accuracy in the prediction of the replacement time as well can improve.

It should be noted that the aforementioned third embodiment is explained by taking a case where the work content (demolition and civil engineering) of the hydraulic excavator 1 is used as the use environment information, as an example. However, the present invention is not limited thereto, but, for example, as the use environment information, areas in which the construction machine is used, for example, working areas of countries, districts, prefectural and city governments, local governments and the like may be used as the use environment information. For example, in a case of using countries as the working area as the use environment information, it is possible to perform calculation of the present degree of the progress of the life of a fuel filter, calculation of the future degree of the progress of the life of the fuel filter, and finally the prediction of the replacement time can be performed considering use of fuel having a different quality for each of the countries. Further, for example, in a case where the country is a desert region, it is possible to perform the calculation of the life and the prediction of the replacement time considering the desert dusts.

That is, the first embodiment is explained by taking a case of using the information of the operator as the use environment information as an example. The second embodiment is explained by taking a case of using the information of the user (use company) as the use environment information as an example. The third embodiment is explained by taking a case of using the information of the working content (construction content) as the use environment information as an example. However, the use environment information is not limited to one use aspect, but may use a plurality of use aspects. For example, a plurality of use aspects (an operator, a user, a working content and a working area) may correspond to one piece of the identification information of the portable device. In addition, not only an operator, a user, a working content and a working area, but also information in regard to an environment in which a construction machine is used, such as a business category of a user (business category for use of a construction machine), that is, various kinds of information in regard to the use aspect of the construction machine can be used as the use environment information. Information on what kind of use aspect is used can be selected (as one or more) from various kinds of use aspects depending upon a type of a construction machine (a hydraulic excavator or wheel loader), a working content, an area for use and the like.

The aforementioned first embodiment is explained by taking a case where the portable device 27 is read out by the RFID readout device 26 to acquire the use environment information, as an example. However, the present invention is not limited thereto, but may be configured such that an operator, a user, an owner or the like of a construction machine uses a (user-side) computer to cause a center server (use environment memory section) to register (store) use environment information (at least one use aspect). In addition, in regard to the configuration of a portable device and a readout device, various types of recognition sections such as a readout device using a system other than the RFID readout device 26, for example, a readout device using a barcode or a secondary code, or the like may be used. This is likewise applied to the second embodiment and the third embodiment.

The aforementioned first embodiment is explained by taking a case where the operating information of the hydraulic excavator 1 includes the pilot pressure in regard to the working, the revolving and the traveling, the rotational number (rotational speed) of the engine, ON/OFF of the accessory, the pump pressure and the oil temperature, as an example. However, the present invention is not limited thereto, but various types of state amounts of a construction machine, such as a fuel consumption quantity may be used. This is likewise applied to the second embodiment and the third embodiment.

The aforementioned first embodiment and second embodiment are explained by taking a case where the replacement time of the hydraulic hose as the replaceable component is predicted, as an example, and the third embodiment is explained by taking a case where the replacement time of the filter (air filter) as the replaceable component is predicted, as an example. However, the present invention is not limited thereto, but it is possible to predict the replacement time of various types of replaceable components such as an arm and a bucket configuring a working mechanism, connecting pins for connecting them, bushes (bearing tubes) for supporting the connecting pins, grease for lubricating the connecting pins and the bushes, a bucket stopper, transmission oil of a revolving device, a transmission seal of the revolving device, revolving bearings (revolving wheels), grease of the revolving device, transmission oil of a traveling device, a transmission seal of the traveling device, traveling hydraulic motors, traveling rollers, crawler belts, the shoes of the crawler belts, engine oil, an engine oil filter, hydraulic oil, a hydraulic oil filter (oil filter), and the like.

In addition, each of the aforementioned embodiments is explained by taking a case where the engine-type hydraulic excavator 1 driven by the engine 8 is used as the construction machine, as an example. However, the present invention is not limited thereto, but the present invention may be applied to a hybrid-type hydraulic excavator that is driven by an engine and an electric motor, and further, an electric hydraulic excavator. The present invention is not limited to the hydraulic excavator, but may be widely applied to various types of construction machines such as wheel loaders, hydraulic cranes, dump trucks, and the like.

DESCRIPTION OF REFERENCE NUMERALS

1: Hydraulic excavator (Construction machine)
24: Controller
26: RFID readout device (Readout device)
27: Portable device
32: Center server
36: Memory device (Operating information memory section, replaceable component information memory section, use environment memory section)
37: Component life information processing section (replacement time predicting section)
51, 61, 72, 73: Characteristic line (Present degree of progress of life of replaceable component)
52, 53, 55, 62, 63, 74, 75, 76, 77: Characteristic line (Future degree of progress of life of replaceable component)

The invention claimed is:

1. A replaceable component management system for a construction machine comprising:
    an operating information memory section for storing operating information including a detection value and an operating time of each of components in a construction machine;
    a replaceable component information memory section for storing replaceable component information including a use start date of a replaceable component in said construction machine requiring replacement upon coming to the end of their life; and
    a replacement time predicting section for predicting a replacement time of said replaceable component by using said operating information stored in said operating information memory section and said replaceable component information stored in said replaceable component information memory section, characterized in that:
    said replaceable component management system for the construction machine includes:
    a use environment memory section for storing, as use environment information of said construction machine, at least one use aspect of use aspects of said construction machine including an operator, a user, a business category of a user, an area of a user, a working content, and a working area of said construction machine, which is information different from said operating information and said replaceable component information, wherein
    said replacement time predicting section predicts the replacement time of said replaceable component by using said use environment information stored in said use environment memory section in addition to said operating information and said replaceable component information, wherein
    said construction machine is provided with a readout device that reads out said identification information of a portable device in which specific identification information is recorded, and
    at least one of said use aspects corresponding to said identification information of said portable device read out by said readout device is stored as said use environment information in said use environment memory section.

2. The replaceable component management system for the construction machine according to claim 1, wherein
    said construction machine includes an activation determining section that determines whether or not an activation of said construction machine is permitted based upon said identification information of said portable device read out by using said readout device.

3. The replaceable component management system for the construction machine according to claim 1, wherein
    said replacement time predicting section predicts the replacement time of said replaceable component based upon a present degree of progress of a life of said replaceable component calculated using said operating information and said replaceable component information and a future degree of the progress of the life of said replaceable component calculated using said operating information and said use environment information.

4. The replaceable component management system for the construction machine according to claim 3, wherein
    said replacement time predicting section calculates said present degree of the progress of the life of said replaceable component by using said use environment information in addition to said operating information and said replaceable component information.

* * * * *